Jan. 17, 1950　　　　O. F. BAUER　　　　2,494,984
QUENCHING PRESS
Filed Feb. 8, 1945　　　　　　　　　　　　8 Sheets-Sheet 1

Inventor
OLIVER F. BAUER.
By
Attorney

Jan. 17, 1950   O. F. BAUER   2,494,984
QUENCHING PRESS
Filed Feb. 8, 1945   8 Sheets-Sheet 3

Inventor
OLIVER F. BAUER
By
B. Schlesinger
Attorney

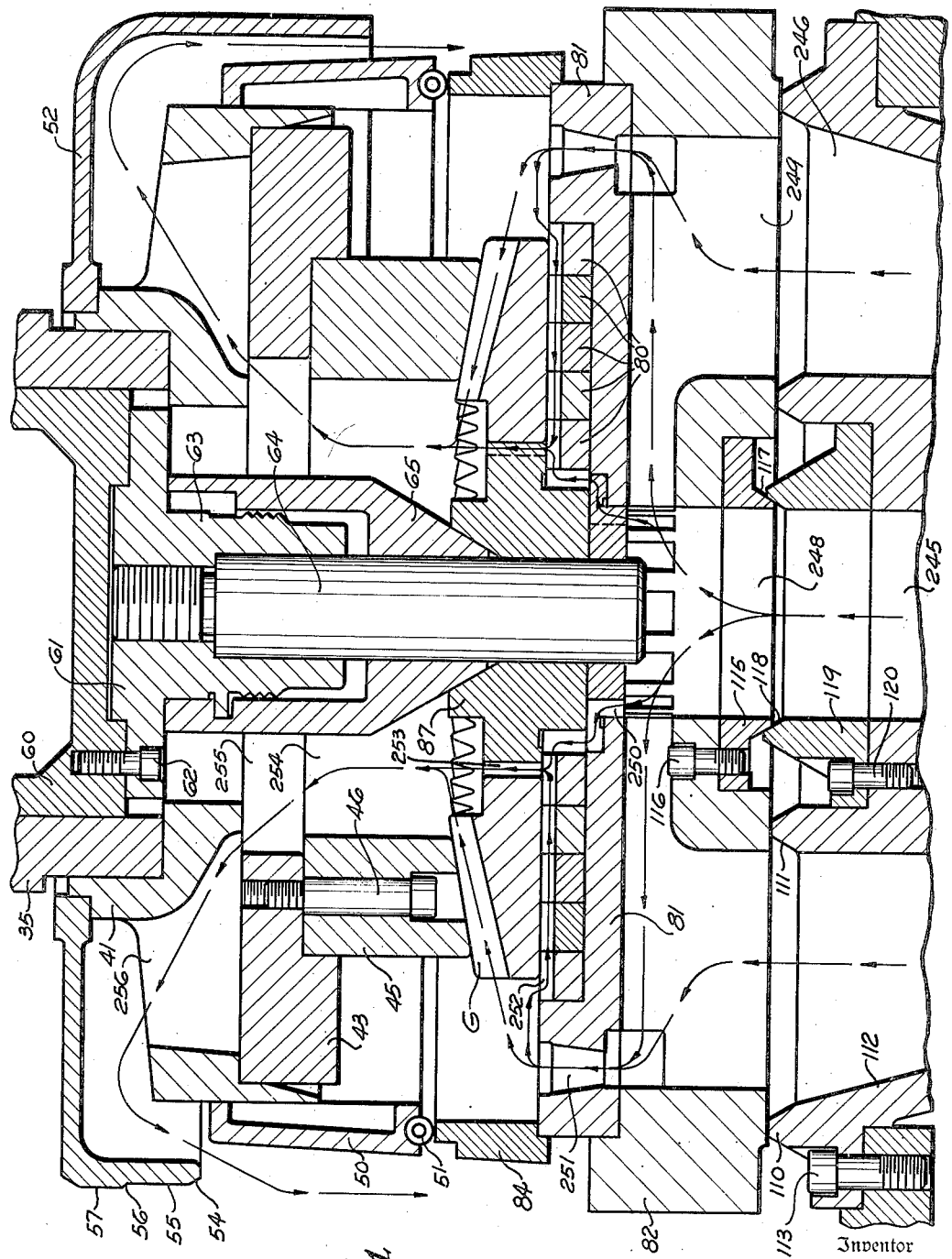

Jan. 17, 1950     O. F. BAUER     2,494,984
QUENCHING PRESS
Filed Feb. 8, 1945     8 Sheets-Sheet 5
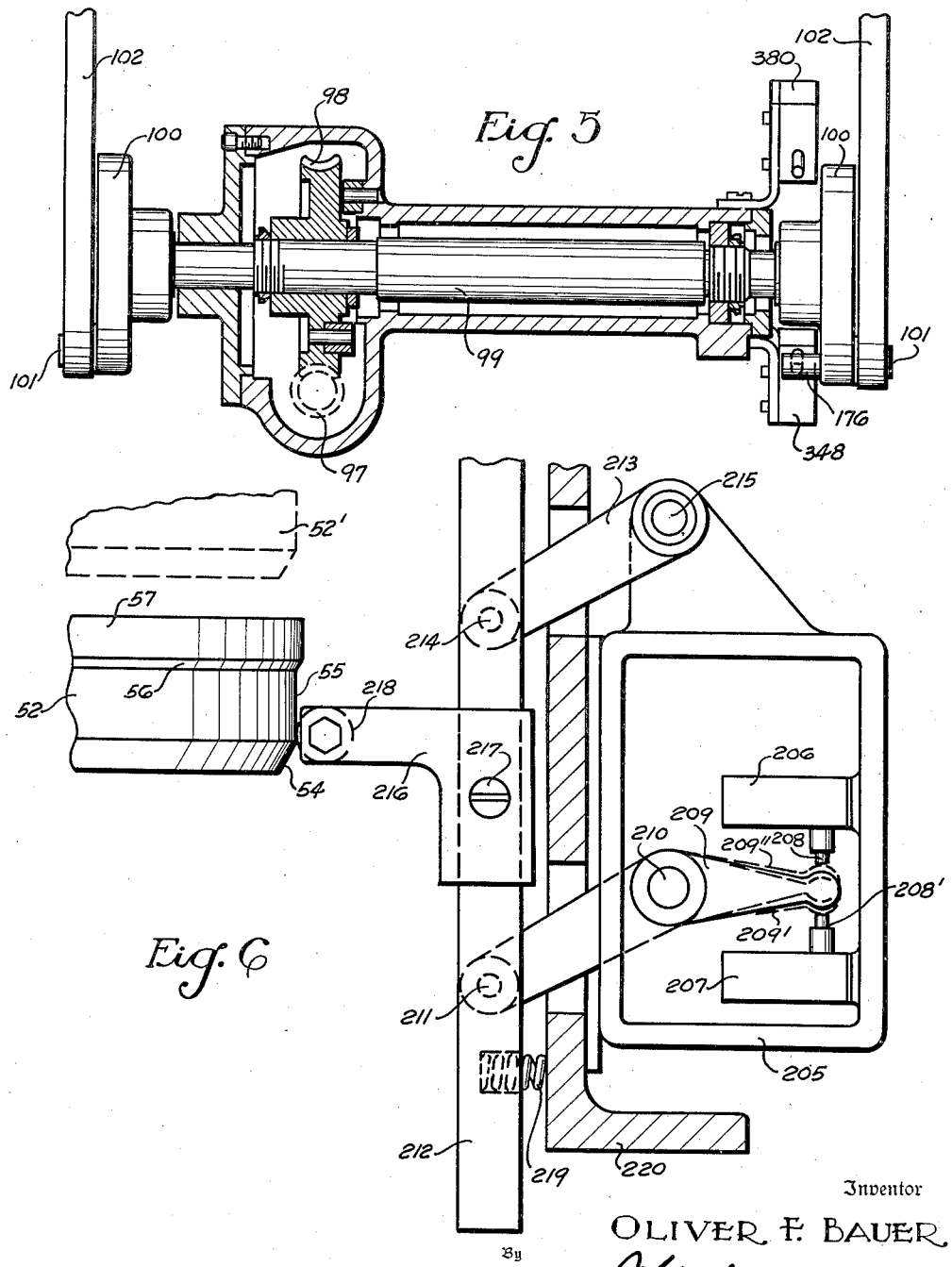
Inventor
OLIVER F. BAUER
By B. Schlesinger
Attorney Jan. 17, 1950　　　　　O. F. BAUER　　　　　2,494,984
QUENCHING PRESS
Filed Feb. 8, 1945　　　　　　　　　　　　8 Sheets-Sheet 6

Inventor
OLIVER F. BAUER
By
Attorney

Patented Jan. 17, 1950

2,494,984

UNITED STATES PATENT OFFICE 2,494,984

QUENCHING PRESS

Oliver F. Bauer, East Rochester, N. Y., assignor to Gleason Works, Rochester, N. Y., a corporation of New York Application February 8, 1945, Serial No. 576,876

17 Claims. (Cl. 266—6)

The present invention relates to quenching presses and particularly to presses for holding and quenching gears or similar articles, after they have been heated, so that they may be hardened without distortion.

One object of the invention is to provide a quenching press in which complete control may be had over the volume and rate of flow of the quenching fluid around the heated workpiece at all stages of the quenching operation.

Another object of the invention is to provide a quenching press in which positioning and removal of the work is facilitated and made very convenient for the operator.

Another object of the invention is to provide a quenching press on which the work may not only be positioned quickly but also with great accuracy, so that when the hardening operation is finished, the work will be true in every respect.

Another object of the invention is to provide a quenching press having means for sealing the quenching fluid around the work during quenching to insure thorough and speedy hardening.

A further object of the invention is to provide a quenching press in which the quenching operation is accomplished by passing the quenching liquid over the article to be hardened instead of by immersing the article in the liquid, and in which the article is held, therefore, on a relatively fixed lower die during hardening.

Still another object of the invention is to provide a quenching press in which the flow of the quenching medium is controlled from the operation of clamping the article to be hardened, so that the article must first be held rigidly against distortion before the quenching medium can flow around it.

A still further object of the invention is to provide a quenching press in which the work is moved from loading position to quenching position automatically prior to the quenching operation and from operating position to loading position automatically after the quenching operation is completed.

Still another object of the invention is to provide a quenching press in which the cycle of the hardening operation is automatic from the time that the work leaves loading position to move to operating position until it is returned to loading position again after the hardening operation is completed.

Other objects of the invention will be apparent hereinafter from the specification and from the recital of the appended claims.

This invention relates to quenching presses of the type that may be used in a hardening process in which the work is first heated in a furnace to the required temperature and is then placed in a quenching press to be held against distortion while a suitable quenching liquid is flowed over it to harden it and cool it. In such quenching presses, the work is customarily held, during quenching, between an upper and a lower die to prevent dishing or warping, and a plurality of gripper segments are expanded within the bore of the work to hold the bore true and prevent out-of-roundness or eccentricity. The gripper segments are usually operated by a tapered expander which may move with but independently of the upper die. The upper die may be carried by a fluid-pressure-operated piston and the tapered expander may be secured to a piston which is mounted in the first piston to be movable with the first piston but also to be movable independently thereof. When the first piston is lowered, the expander is brought into engagement with the gripper segments to force them firmly into and against the bore of the work and the upper die is brought into engagement with the upper face of the work to hold the work securely on the lower die.

In conventional forms of such quenching presses, the lower die is mounted directly beneath and in line with the upper die, and in order to put a hot blank into the press or to remove a hardened workpiece therefrom, it is necessary for the operator to reach over the base of the press and into the limited space between the upper and lower dies. This is often awkward and therefore difficult and tiring. In the press of the present invention, the lower die and the gripper segments are mounted on a bracket which is swingable from operating position to loading position and vice versa. In operating position, the lower die and the gripper segments are in registry, respectively, with the upper die and expander, so that when the upper die and expander are lowered the work can be clamped. In loading position, the lower die and the gripper segments are in position where the operator can readily mount a new, heated workpiece or remove a completed, hardened job. The operation of quenching is thus speeded up, and the strain and exertion required of the operator is thus very materially reduced.

In conventional quenching presses, the prime consideration has been the drastic, initial quench and after that has been obtained, the liquid flowing over the work has served simply to cool the work to the temperature required for handling. There has been no control over the volume or rate of flow of the quenching medium over the work after the initial quench. Thus the molecular structure of the hardened workpiece has depended almost entirely on the volume of quenching liquid that can be flowed over the work in the first few seconds of the quenching operation, that is, in the period of the initial or drastic quench. With the present invention a quenching press has been provided in which it is possible to control volume of the flow of the quenching fluid at all stages of the quenching operation. Thus, with the new press it is possible to obtain, for instance, a fast, drastic quench until the critical point of the hardening temperature is reached, then a slow quench to stabilize the molecular structure of the work and cool the metal without causing distortion, and then a quick cooling quench to bring the job to a point where the operator can handle it. In the press of the present invention, it is also possible to insure for each particular job a volume of quenching liquid suitable for hardening that particular job. Too great a volume might in a particular job cause distortion, while in another case that same volume might be just what is desired.

In the press shown in the drawings, the volume of the quenching liquid at various stages of the quenching operation is controlled by three solenoid-operated valves, and the solenoids are in turn controlled by three electric timers. Each valve permits a different amount of liquid to flow to the work. When all three valves are open the maximum volume of liquid flows to the work. Manually adjustable controls are provided by adjustment of which various combinations of valves may be preselected for operation in a particular order. Other adjustable controls are provided by which the timers may be adjusted to control the times during which each combination of valves is to operate. In this way, the volume of the quenching fluid flowing over the work during successive stages of the quenching operation may be predetermined and controlled.

In some prior types of quenching presses, controls have been provided, which cause the upper die to be disengaged from and moved clear of the work automatically at the end of the hardening operation. In the new quenching press of the present invention, besides the controls already described, other controls are provided which permit complete automatic operation of the press from the moment the workpiece, which is to be hardened, is placed on the bracket in loading position until the hardened article is returned by the bracket to loading position again, ready for removal by the operator. When the operator presses the starting button, he starts a motor which moves the bracket to swing the work into operating position. When the bracket reaches operating position, through limit switches, the motor is stopped, and the piston carrying the upper die is actuated, causing it to descend. Through a control cam mounted on the piston, the rate of downward movement of the piston is controlled. In the first part of its downward movement, the piston descends fast, but as the upper die approaches the work, the piston is automatically slowed down to prevent the upper die from hitting the hot workpiece hard. When the upper die has, however, engaged the workpiece, full pressure is put on again to hold the work securely during quenching. Then through the tripping of a limit switch the quenching liquid is turned on and flowed around and over the work in the volume and time cycle predetermined by the settings of the various controls already described. When the quenching cycle is complete, through suitable electrical trips, the valve, which controls the upper-die piston, is reversed and the piston is moved upwardly to disengage the upper die from the work. When the piston reaches its uppermost position, a limit switch is tripped and the bracket motor is restarted. The bracket is then swung out to move the work to loading position. The operator can then remove the now hardened gear and place a new heated workpiece in its place.

In the accompanying drawings:

Fig. 4 is an enlarged vertical sectional view of a typical set-up, showing the hardening of a bevel gear, and showing the upper and lower dies used for the purpose in operative engagement with the work, with the upper die at the limit of its downward movement;

Fig. 5 is a fragmentary detail view showing in section part of the mechanism for operating the swinging bracket which carries the lower die;

Fig. 6 is a detail view showing the cam and the mechanism associated therewith which operate to control the speed of downward movement of the upper die and of the piston which moves the same;

Reference will now be had to the drawings for a more detailed description of the invention.

Figure 2:
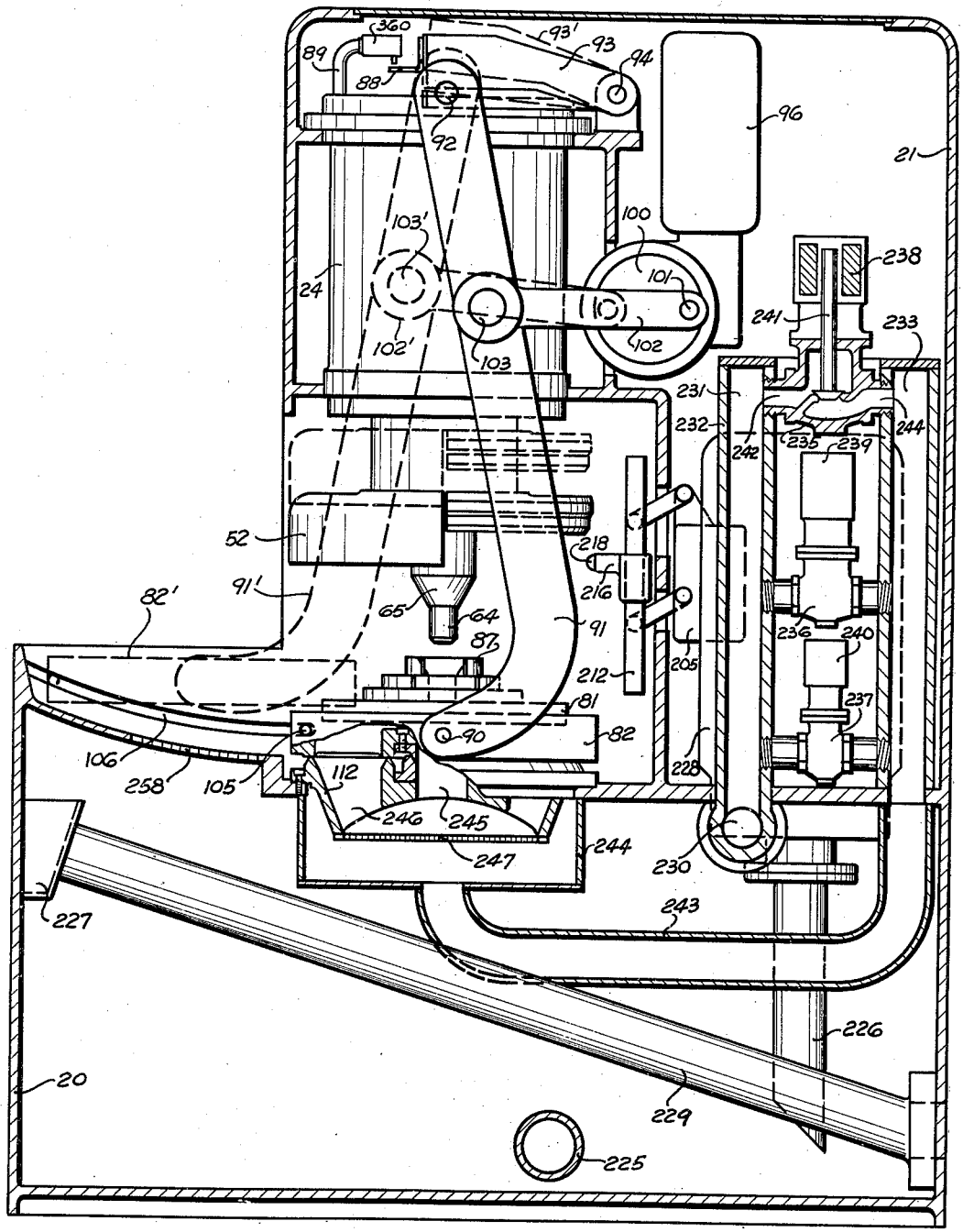
Fig. 2 is a vertical sectional view of this quenching press, the section being taken from front to rear.
Figure 3:
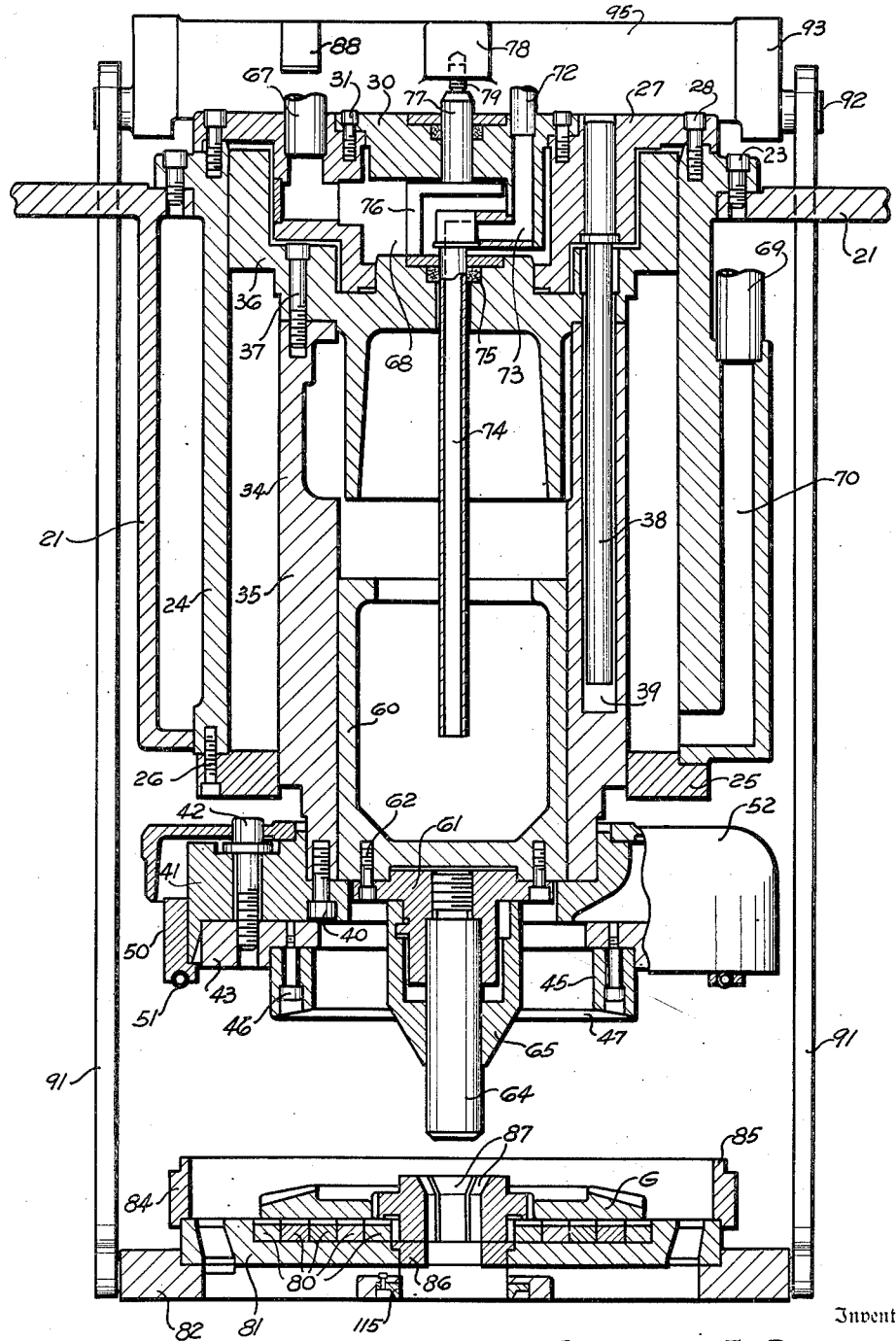
Fig. 3 is a sectional view taken at right angles to the view of Fig. 2 and on a somewhat enlarged scale, showing the upper die and its associated parts and the swinging bracket on which the lower die is mounted, the upper die and the piston, which operates the same, being shown in their uppermost or inoperative positions.

The quenching press shown has a frame consisting of a base portion 20 and an upright or column portion 21. These may be, as shown, integral with one another. Secured to the ribbing of the upright portion 21, as by means of screws 23, is an open-ended casing or housing 24 (Figs. 2 and 3). To the lower end of this casing there is secured by screws 26 a bearing or guide member 25. The upper end of the casing is closed by an end plate 27, which is secured to the casing by screws 28, and by a cap member 30 which is secured in a central opening, formed in the end plate 27, by screws 31 that thread into the end plate.

Mounted to reciprocate in the housing 24 is a piston 34. This piston has a skirt portion 35 and a head portion 36, and the two portions are secured together by screws 37. Skirt portion 35 of the piston is guided during reciprocation of the piston by the guide 25, extending through a central opening formed in the guide, while the head portion 36 of the piston fits into the bore of the casing 24 and is guided by the internal wall surface of the casing. The piston is held against rotary movement with reference to the casing 24 by a pin 38 which is secured in the end plate 27 and which passes through an aperture in the head 36 of the piston into an elongated hole 39 formed in the skirt 35 of the piston.

Secured to the bottom of the piston by means of screws 40, which thread into the skirt portion 35, is a plate 41. Removably secured to this plate 41, by means of screws 42, is a second plate 43. The upper die 45 is secured to the under face of the plate 43 by screws 46. The die 45 has its under face 47 shaped to conform to the shape of the upper face of the workpiece which is to be hardened in the quenching press, and for each different job a suitably shaped upper die is used. In the instance shown in Fig. 3, the upper die 45 has an internal conical lower operating face 47 formed to correspond to the shape of the external conical upper face of the bevel gear G which is to be hardened.

Secured to the periphery of the plate 41 by screws or other suitable means (not shown) is a cylindrical guard 50. This guard is adapted to cooperate with a lower guard 84, hereinafter described, to surround the work, when the upper die is in operative engagement with the work, and form a chamber for holding the quenching fluid so that it will flow in and around the teeth and other parts of the gear which are to be hardened. A hollow ring 51, made of rubber, neoprene or any similar substance, is secured in the under face of the guard 50 to insure a complete seal around the work when the upper and lower guards are in operative engagement.

Fastened to the upper face of the plate 41, by screws or other suitable means (not shown), is skirt-shaped cam member 52. This cam member has a smooth, uninterrupted surface around half of its external periphery, but around the other half it is formed with a cam or control surface comprising a bevel nosed portion 54 (Fig. 6), which is inclined to the longitudinal axis of the piston, a dwell portion 55, parallel to that axis, a bevel portion 56, inclined to that axis, and another dwell portion 57 parallel to that axis. The diameter of the dwell portion 57 is greater than the diameter of the dwell portion 55.

The piston 34 is hollow, and mounted to reciprocate in the bore of the skirt portion 35 of the piston is a second piston 60 (Fig. 3). To the lower end of this piston 60 there is secured a nipple 61 by means of screws 62. A pilot member 64 is threaded into a central opening in the nipple 61 and threaded over the periphery of the nipple 61 is an expander 65. The expander has a central opening through which the pilot 64 projects and the expander is tapered at its lower end to engage the gripper segments and expand the same within the bore of the work, as will be described more particularly hereinafter.

The pressure fluid for operating the piston 34, in this case compressed air, is supplied to the upper end of the cylinder 24 through a pipe 67. This pipe communicates with a right angular duct 68 drilled in the end plate 27 and leading to the head 36 of the piston 34. The pressure fluid is supplied to the opposite side of the piston 34 from a pipe 69 which communicates with a duct 70 that is drilled in the casing 24 and that leads into the interior of this casing below the head 36 of the piston 34. The pressure fluid is supplied to and exhausted from the piston 60 through a pipe 72. This pipe communicates with a right angle duct 73 formed in the end plate 30, and the duct 73 communicates, in turn, with a pipe 74 which is disposed centrally of the piston 34 and which extends through a packing gland 75 in the head 36 of the piston 34 into the skirt of the piston 60 and close to the bottom wall of this piston 60.

The work G, which is to be hardened, is adapted to be mounted on a lower die comprising a plurality of, in the case shown in Fig. 3, five, internested rings 80. These rings have their upper faces shaped to conform to the shape of the back face of the article which is to be hardened. In the case illustrated in Fig. 3 their upper faces are plane to conform to the plane back face of the bevel gear G which is to be hardened. The rings are mounted in a recess formed in a plate 81 which is secured in any suitable manner in a recess formed on the upper face of a plate 82. The lower guard 84, already referred to, is secured in any suitable manner to the upper face of the plate 81. The upper face 85 of this guard 84 forms a seat for the resilient ring 51 that is secured in the under face of the upper guard 50. Thus, a seal is provided between the upper and lower guards when the upper guard is in operative position.

Mounted centrally within an opening in the plate 81 is a hardened ring 86 and on the upper face of this ring are seated a plurality of gripper segments 87. The external or peripheral faces of these segments are shaped to conform to the shape of the bore of the article to be hardened, while the internal surfaces of these segments are shaped to receive the pilot 64 and the expander 65. As the piston 60 descends, the pilot 64 first enters between the segments to center them up, and then the expander member 65 engages the segments to expand them within the bore of the gear or other workpiece, which is to be hardened, to hold the article against distortion in the bore.

Figure 1:
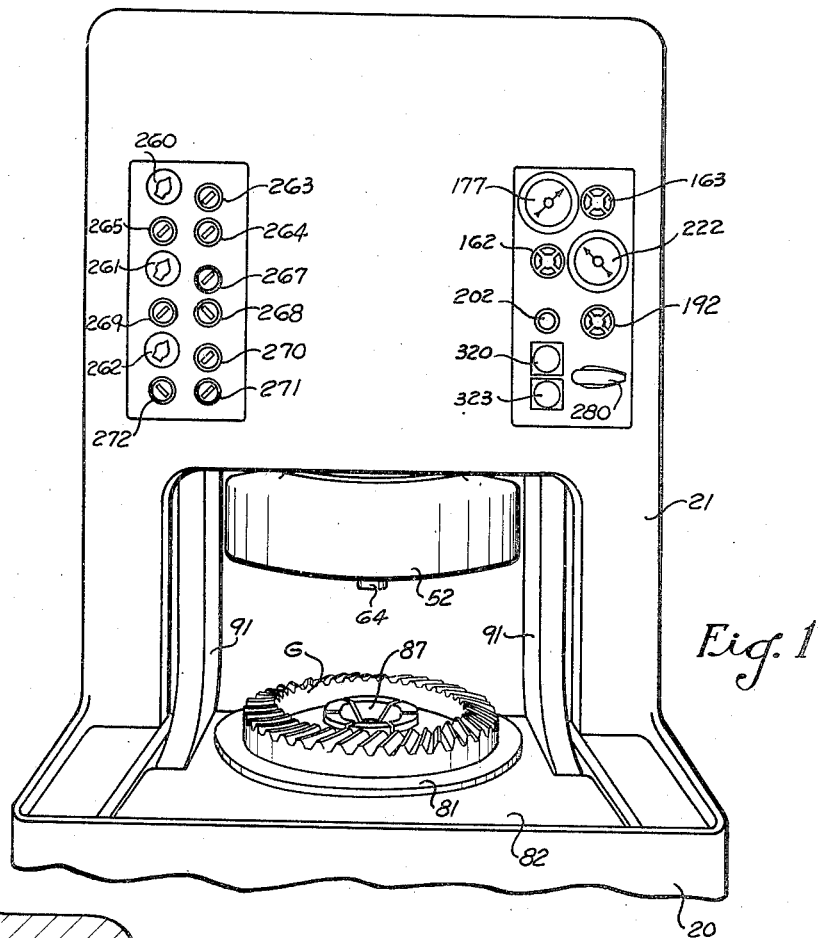
Fig. 1 is a fragmentary front elevation of a quenching press built according to a preferred embodiment of this invention, the work being shown in out or loading position.

The plate 82 is secured by diametrically opposite pins 90 (Fig. 2) to the lower ends of a pair of parallel arms 91 (Figs. 1, 2, and 3). These arms are pivotally connected at their upper ends by means of pins 92 to a pair of arms 93 that are integral with a bar or strap 95 and that are pivotally mounted on the column 21 at their rear ends by means of a pin 94.

The arms 91 are adapted to be rocked about their pivots 92 to move the plate 82 and with it the lower die from loading position to operating position and vice versa. For this purpose a motor 96 is provided. This motor is mounted in the column 21. A worm 97 (Fig. 5), which is secured to the armature shaft of this motor, meshes with and drives a worm wheel 98 which is fastened to a shaft 99. This shaft is journaled in suitable bearings in the upright 21 of the machine. Integral with or secured to the opposite ends of this shaft are crank plates 100. These are connected by pins 101 with link members 102 (Fig. 2) which are pivotally connected by pins 103 with the arms 91.

Through the mechanism described, the arms 91 can be oscillated about their pivot pins 92 to move the plate 82 and the parts supported thereby from operating to loading position and vice versa. The arms 91, link members 102 and arms 93 are shown in full lines in Fig. 2 in the positions they occupy when the plate 82 is in operative position, while they are shown in dotted lines in the positions they occupy when the plate 82 is in loading position. In this movement from loading to operative position and return, the plate 82 is guided by pins 105 which project from opposite sides of the plate 82 and which engage in arcuate slots 106 (Fig. 2) formed in the base portion 20 of the press.

In operative position, the bracket or plate 82 is adapted to rest on plane-surfaced seating portions 110 and 111 (Fig. 4) of a seating member 112 which is secured by screws 113 to the base portion 20 of the machine. To hold the lower die accurately in alignment with the upper die, when the bracket or plate 82 is in operative position, cooperating male and female centering members 115 and 119 are provided. The male member 115 is secured by means of screws 116 in a recess formed centrally in the underface of the plate 82. The female member 119 is secured by screws 120 in a recess formed centrally in the upper face of the seating member 112. The member 115 is formed with an external conical seating surface 117 which is adapted to be engaged with the internal conical seating surface 118 of the member 119.

Fig. 4 shows the positions of the parts when the piston 34 is in its lowermost position and the upper die 45 is in operative engagement with the work. Before the bracket 82 can be swung to loading position, it is necessary to lift the centering member 115 out of engagement with the centering member 119. To this end, an angle iron piece 76 (Fig. 3) is provided. This angle iron piece is secured to a post or stud 77 that projects upwardly through a hole formed centrally in the cap member 30, and that engages a stop-screw 79 that is threaded adjustably into a lug 78. The lug 78 is formed integral with the bar or strap 95 which, as already described, connects the two arms 93. As the piston 34 approaches the upper end of its stroke, its head 36 strikes the angle piece 76 and through the stud 77 and stop-screw 79 moves the arms 93 and pins 92 upwardly, lifting the centering member 115 off its seat. The stop-screw 79 permits adjustment of the point where the motion of the piston 34 lifts the bracket 82 off its seat.

The bar 95 has an angle plate 88 secured to its front face. This angle plate is adapted to engage the plunger of a limit switch 360 to close this switch and start the motor 96. Thus, the motor 96 is started automatically to swing the bracket 82 and the work to loading position when the piston 34 reaches its uppermost position, as will hereinafter be described more particularly. The limit switch 360 is mounted on a post 89 which is secured in the end plate 27.

When the bracket 82 is returned to operating position, the arms 91 bring the centering member 115 over the centering member 119 and when the piston 34 starts to move downward, the cooperating conical portions 117 and 118 of the centering members engage one another and align the lower die accurately with the upper die.

Figure 11:
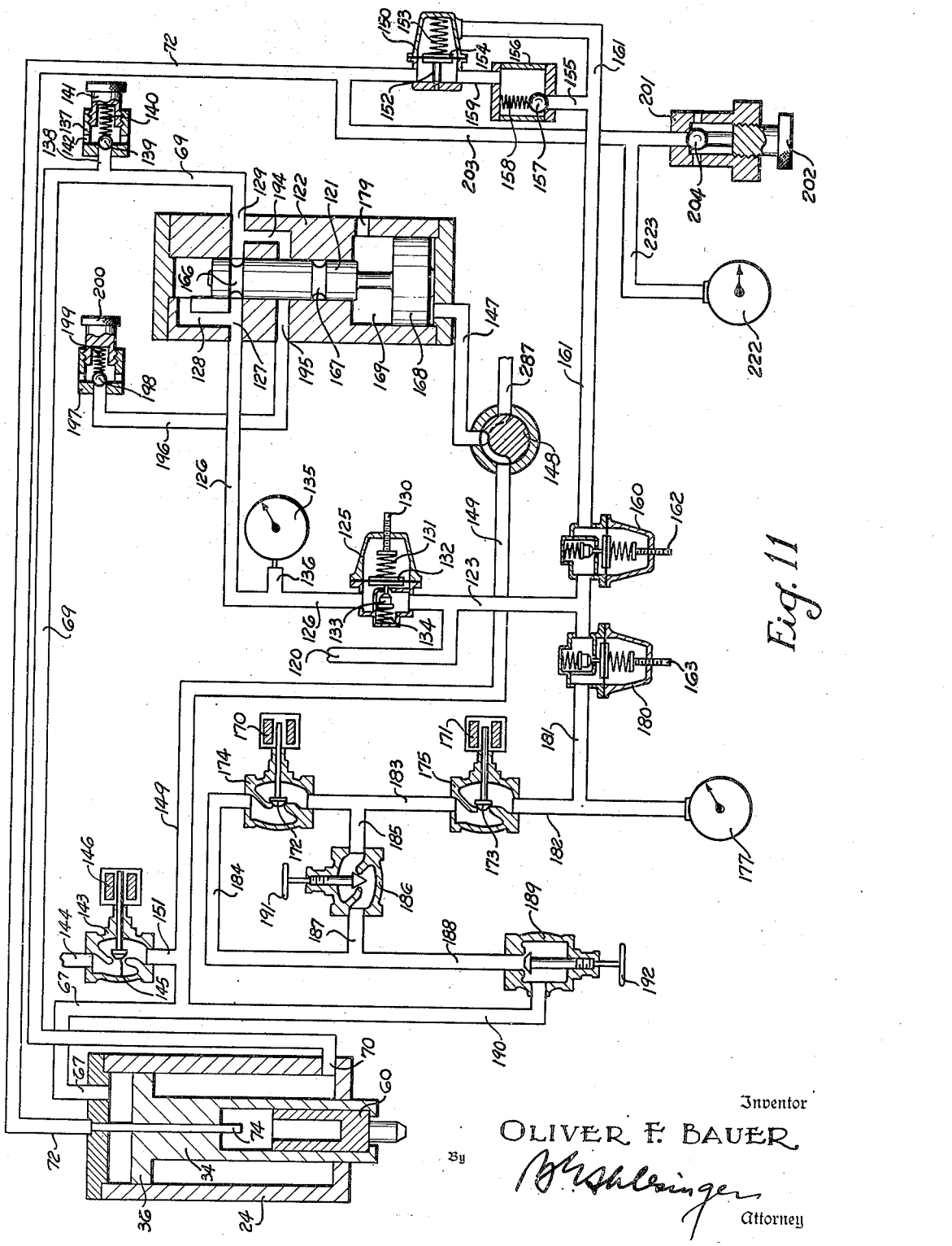
Fig. 11 is a diagram of the pneumatic circuit of the press and illustrating its mode of operation.

The pressure fluid for operating the pistons 34 and 60 is supplied to the machine from any suitable source, for instance, an external source through piping denoted diagrammatically at 120 in Fig. 11.

One of the features of the press illustrated is that pressure is maintained on the under side of the head 36 of the piston 34 not only during upward movement of the piston but also during downward movement of the piston. The amount of pressure on the underside of the piston head during the downstroke is, of course, less than the amount of pressure on the upper side of the piston head during this stroke, and is also less than the amount of pressure on the underside of the piston head on the upstroke of the piston. The amounts of pressure on the two sides of the piston head 34 are regulated by pressure reducing valves 125, 160, and 180 and by blow-off valves 137 and 197. A shuttle valve 121, which is reciprocable in a valve casing 122, serves to maintain pressure on the under side of the piston during its downstroke, as will hereinafter more particularly be described.

The reducing valves 125, 160, and 180 may be of any standard or suitable construction and preferably are all made alike. The structure of only one of these valves, 125, need, therefore, be described here. In this valve, the valve member 133 is secured to a diaphragm 132. The valve member is normally pressed open by a coil spring 131, the tension of which can be adjusted by a screw 130. A coil spring 134 serves to counteract in part the action of the spring 131 and tends to force the valve member 133 toward closed position. By suitable adjustment of the screw 130, the amount of air-pressure required to close the valve member 133 can be adjusted, that is, the amount of pressure in the line 126 can be predetermined. In similar way the valves 160 and 180 can be adjusted by the screws 162 and 163 to control the amounts of pressure in the lines 161 and 181.

A gauge 135, which communicates with the duct 126 through a duct 136, may be used in the adjustment of the valve 125, while a gauge 177, which communicates with the duct 181 through the duct 182, is used in adjustment of the valve 180.

The blow-off valves 137 and 197 may be of any standard or suitable construction and preferably are alike in structure. The blow-off valve 137 may consist, for instance, of a ball valve member 139, which is normally held in closed position by a coil spring 140, the tension of which may be adjusted through a knurled nut 141 that threads into the valve casing. Blow-off openings 142 are drilled in opposite sides of the casing.

The direction of movement of the piston 34 is controlled by three solenoid operated valves 143, 174, and 175. The valve 143 is a normally open valve while the valves 174 and 175 are normally closed valves.

An adjustable throttle valve 189 governs the normal speed of the downstroke of the piston 34, while a needle-valve 186 controls the speed of the downward movement of this piston in the part of its downstroke just before the upper die hits the hot workpiece. The openings of the valves 186 and 189 may be adjusted by the handwheels 191 and 192, respectively. The press may be manually or automatically operated. A three-way valve 148, which is manually adjustable, is provided to permit the operator to preselect the mode of operation of the press. In the positions of the parts shown in Fig. 11, the pressure fluid flows from the duct 120 into the duct 123 and thence through the reducing valve 125 and a duct 126 into the casing 122 of the shuttle valve 121.

The shuttle valve has a stem portion which is provided with two spaced peripheral grooves 166 and 167 and with an enlarged head 168 which forms a piston that is reciprocable in a cylinder 169 formed in the valve casing 122.

From the duct 126 the pressure fluid flows through a duct 127 both into a duct 128 and around the groove 166 in the valve stem. This groove communicates with a duct 129. The pressure fluid flowing into the duct 128 holds the valve in the position shown. From the duct 129 the pressure fluid flows through the piping 69, and duct 70 to the under side face of the head 36 of the piston 34. The pressure on the under face of the piston is, of course, controlled at this time by the reducing valve 125 and relief valve 137.

At this time, the upper face of the piston head 36 is on exhaust through the pipe 67 (Figs. 3 and 11), the duct 151 which communicates with this pipe, the solenoid-operated valve 143, and the duct 144 to the open air, the solenoid 146, which operates the valve 143, being at this time deenergized and the valve member 145 being open.

At this time, also the lower end of the cylinder 169 is on exhaust through the line 147, the manually operable three-way valve 148, and the duct 149 which connects with the duct 151 that leads to the open solenoid-operated valve 143.

At this time also, the upper end of the piston 60 is on supply, being connected with the duct 123 through duct 72, a differential relief valve 150, the check valve 156, the ducts 155 and 161, and the reducing valve 160.

The differential relief valve 150 may be of any suitable or standard construction. As shown the valve member 152 is normally pressed to closed position by a coil spring 153 which presses on the diaphragm 154 that carries the valve member.

The pressure in the line 161 cooperates with the pressure of the spring 153 to hold the valve member 152 closed. The pressure fluid therefore flows from the duct 155, through the check valve 156, opening the ball member 157 of that valve against the resistance of the spring 158, and thence through the duct 159, and the valve 150 into the line 72.

The described and illustrated positions are the positions which the parts of the pneumatic system occupy when the piston is in its uppermost position, shown in Fig. 3. The piston 60 is, however, always on pressure, both during the up and the down strokes of the piston 34. The valve 150 permits relief of the line from excess pressure when the piston 34 is in the down position and the expander is engaging the segments 87 to grip the bore of the work. If it is found that for any given type of work to be hardened a reduced gripping pressure in the bore during hardening is desirable, the pressure in the line 72 can always be lowered by use of the bleeder valve 201 which is connected with the line 72 by the duct 203.

The bleeder valve includes a ball member 204 which can be clamped shut by a screw member 202 that threads into the valve casing. For adjusting the amount of pressure in the line 72, a gauge 222 is provided. This gauge is connected with the duct 203 by a duct 223.

When the operator presses the starting button of the machine, the bracket 82, which carries the work is moved from loading position to operating position, as will be described more particularly hereinafter. When the bracket 82 reaches operating position, the pin 176 (Fig. 5), which is carried by one of the crank plates 100 engages the plunger of the limit switch 348 and closes that limit switch. This causes the solenoids 146, 170, and 171 to be energized, as will hereinafter be described, and the valve 143 is closed, while the valves 174 and 175, are opened. This allows the air under pressure to flow from the line 123 through the reducing valve 180, the ducts 181 and 182, and the valve 175 into the duct 183. Thence it flows both through the valve 174 and the duct 184, and through the duct 185, the needle valve 186, and the duct 187, into the duct 188. This duct communicates through the manually adjustable throttle valve 189 and the duct 190 with the piping 67 that leads to the upper end of the cylinder 24.

The pressure fluid also acts through the duct 149, the three-way valve 148, and the line 147 on the under face of the piston portion 168 of the shuttle valve 121 to force this valve upwardly, for the under face of this piston portion 168 has a greater area than its upper face. The air above the piston 168 then exhausts through blow-off opening 179. The result is that the shuttle valve 121 closes off the connection between the ducts 127 and 129 and connects the line 69 with the duct 195 through the duct 129, the duct 194, and the groove 167 in the stem of the shuttle valve 121. The duct 195 connects through the duct 196 with the adjustable relief valve 197, the ball 198 of which is normally held seated by the coil spring 199 whose pressure can be adjusted by the nut 200 which threads into the valve casing. Thus through setting of the relief valve 197, pressure can be exerted on the under face of the piston head 36 during the downstroke of the piston.

The piston 34 descends quite rapidly at first.

Secured to the column 21 is a box 205 (Figs. 2 and 6). In this box are mounted two limit switches 206 and 207 whose plungers 208 and 208¹ are oppositely disposed to one another. The plungers are adapted to be operated by a bell crank lever 209 which is pivoted at 210 in the box 205. The free end of this bell crank lever extends between the two plungers 208 and 208¹. At its opposite end, the bell crank lever is pivotally connected by means of the pin 211 with a bar 212. This bar is carried by a link 213 which is pivotally connected at one end with the bar by means of the pin 214 and which is pivotally mounted at its opposite end by means of the pin 215 on the box 205. There is a bracket 216 adjustably secured to the bar 212 by means of a set screw 217. Rotatably mounted in the projecting arm of this bracket is a roller 218 which is adapted to engage the cam track formed on the periphery of the cam member 52. The roller 218 is resiliently held in engagement with the cam track by a coil spring 219, which is interposed between the ribbing 220 of the column 21 and the bar 212.

In the uppermost position of the piston 34, the cam surface 52 is above and out of contact with the roller 218 as shown in dotted lines 52¹ in Fig. 6. In this position, the spring 219 acting through the bar 212 rocks the lever 209 downwardly to the dotted line position shown at 209¹. This holds the limit switch 207 closed so that, as will be explained more fully hereinafter, as soon as the bracket 82 reaches operating position the solenoids 170 and 171 (Fig. 11) may be energized. Near the bottom of the stroke of the piston 34, the cam portion 54 of the cam member 52 engages the roller 218, and as the piston continues to descend, the roller 218 rides up the cam surface 54 onto the dwell portion 55. Thus, the lever 209 is rocked upwardly to assume the position shown in full lines (Fig. 6). This allows the limit switch 207 to open and the solenoid 170 is deenergized with the result that the valve 172 is closed. The pressure fluid in going to the upper end of the cylinder 24 must now travel through the restricted opening of the needle valve 186. Thus, the downward movement of the piston 34 is slowed up. This prevents the upper die from striking the hot workpiece with any force.

The decelerated movement of the piston continues as long as the roller 218 is riding on the dwell portion 55 of the cam surface, and the bracket 216 is adjusted initially along the bar 212 so that the decelerated movement will continue until just before the upper die engages the work. Then the roller 218 rides on the conical portion 56 of the cam track, moving the lever 209 upwardly to the dotted line position shown at 209". The lever 209 remains in this position while the roller is resting on the dwell portion 57 of the cam. In this position, the lever 209 closes the limit switch 206 which causes the solenoid 170 to be reenergized, reopening the valve 172 and causing full pressure to be applied to the upper die to hold the work securely against distortion during the quenching operation. The closing of this switch also puts in operation the first of the timers controlling the flow of the quenching liquid to the work, as will be described more particularly hereinafter.

After the work has been hardened and cooled to the desired degree, the solenoids 146, 170, and 171 are deenergized as will be described more particularly hereinafter. The valves 174 and 175 then close and the valve 143 then opens. The pressure fluid then flows from the line 120 through the reducing valve 125 and ducts 126, 127, and 128 into the upper end of the valve casing 122 to shift the shuttle valve 121 to the position shown in Fig. 11, the air exhausting from the lower end of the valve casing through ducts 147, 149, and 151, valve 143 and duct 144 to the open air. With the shuttle valve 121 shifted to the position shown, the pressure fluid flows on through the ducts 129, 69 and 70 to the underface of the piston head 36. Simultaneously, upper end of the cylinder 24 is put on exhaust through ducts 67 and 151, valve 143, and duct 144. Thus the piston 34 is returned to its uppermost position, moving the upper die clear of the work.

During the upstroke of the piston 34, the duct 74, that leads to the upper end of the piston 60, remains on pressure from line 120 through duct 123, reducing valve 160, ducts 161 and 155, check valve 156, differential relief valve 150, duct 72 and duct 74. However, as the piston 34 ascends, the plate 41 (Figs. 3 and 4) which is secured to the piston 34, engages the piston 60 and causes the piston 60 to move upwardly away from the work, also.

In setting up the machine, it is desirable to jog the piston 34 up or down through manual operation. For manual operation, the three-way valve 148 is moved to position to connect duct 147 with exhaust duct 287. Thus shuttle valve 121 is held inoperative in the down position shown in Fig. 11. The movement of piston 34 is then controlled by energizing or deenergizing solenoids 146 and 171 as will hereinafter be described more particularly.

The quenching fluid is supplied to the quenching press from any suitable source. In the press illustrated, the quenching liquid is supplied to the press through a pipe 225 (Fig. 2) which is connected to the base 20 of the machine. The base is hollow and forms a sump. The quenching liquid is pumped out of this sump by a pump 228 which sucks the quenching liquid from the sump through a pipe 226. The pump forces the liquid into a duct 230 which is connected with a vertical duct 231 that is formed in a casting 232 which is secured in the column 21.

The quenching liquid is intended to flow from the duct 231 into a parallel duct 233 which is at the opposite side of the casting 232. There are three ducts connecting the ducts 231 and 233 and each of these connecting ducts is controlled by a solenoid-operated valve. The three solenoid-operated valves are designated 235, 236, and 237, respectively. They are of similar construction but their openings are of different sizes. The opening of the valve 235 is the largest; the opening of the valve 237 is the smallest; while the opening of the valve 236 is intermediate in size between those of the valves 235 and 237.

The valve 235 is shown in section in order to show the structure of the several valves. It has a valve member 241 that has an elongated stem that extends into the solenoid 238, and this valve member controls the connection between the duct portions 242 and 244 of the valve that communicate, respectively, with the ducts 231 and 233.

The solenoids for operating the different valves are denoted at 238, 239, and 240, respectively. When all three valves 235, 236, and 237 are open there is a maximum flow of the quenching liquid between the ducts 231 and 233. By opening valve 235 and valve 237 while valve 236 is closed, a different volume of flow of the quenching liquid between the ducts 231 and 233 can be obtained. Other variations in volume of flow can be obtained by making other combinations of open and closed valves, as will be obvious.

The duct 233 is connected by a duct 243 with a trough 244 secured to the base 20 of the machine beneath the plate 112. The quenching liquid flows from the trough 244 upward through a screen 247 that is secured in the bottom of casting 112 and thence through a central opening 245 and a plurality of circularly arranged holes 246 in the casting 112 (Figs. 2 and 4) into a central opening 248 and circularly spaced ducts 249 in the plate 82. Thence the quenching liquid flows through an inner series of spaced circularly arranged openings 250 and an outer series of circularly spaced holes 251 in the plate 81. From these, the quenching liquid flows upwardly through the teeth of the gear G to be quenched, underneath the back face of the gear through radially aligned slots 252 provided in the upper faces of the rings 80, and through slots 253 cut into the peripheral surfaces of the gripper segments 87. Thus the sides of the teeth, back face, and bore of the gear may be hardened and cooled. Thence the liquid flows through the central opening 254 in the upper die 45, the central opening 255 in the plate 43, and circularly arranged spaced openings 256 in the plate 41. Thence the liquid flows into the space between the cam member 52 and guard 50, over the outside of the guards 50 and 84 and plate 82 through a screen 258 (Fig. 2) in the upper face of the base 20 of the machine into the vase or sump of the machine. The overflow of liquid in the sump is carried off through the open upper end of the trough 227 and the pipe 229 to the external source from which the liquid is supplied to the machine. The direction of flow of the quenching liquid around the work is denoted by the arrows in Fig. 4.

In the quenching press illustrated the quenching operations may be effected in three successive stages. The time during which each stage of quenching takes place is determined by the setting of a timer button. The three timer buttons are denoted at 260, 261, and 262, respectively (Fig. 1). The volume of the quenching liquid that is to flow over the work during the different stages of hardening, is determined by the setting of selector buttons which control the operation of the solenoids 238, 239, and 240 (Fig. 2).

There are three selector buttons associated with each timer to permit determining what volume of quenching liquid will flow over the work during the stage of hardening controlled by that particular timer. The selector buttons may be adjusted to either "on" or "off" position. If the three selector buttons associated with a particular timer are all adjusted to the "on" position, then during the stage of quenching controlled by that particular timer, all three of the solenoid-operated valves 235, 236, and 237 (Fig. 2) will be open, and the maximum volume of liquid will flow over the work. If two of the selector buttons associated with a particular timer are in the "on" position and the third is in the "off" position, then the two solenoid-operated valves, which are controlled by the two "on" buttons, will be open and the third solenoid-operated valve will be closed, during the particular stage of hardening controlled by that particular timer. Hence, during that particular stage of operation, the volume of quenching liquid, which flows over the work, will be reduced as compared with the volume flowing during the stage when all solenoid-operated valves are open.

The selector buttons, that cooperate with the timer 260, are denoted at 263, 264, and 265, respectively (Fig. 1). The selector buttons, that cooperate with the timer 261, are denoted at 267, 268, and 269, respectively. The selector buttons, that cooperate with the timer 262, are denoted at 270, 271, and 272, respectively.

Each of the selector buttons 263, 267, and 270 controls the operation of the solenoid 238 (Fig. 2). Each of the selector buttons 264, 268, and 271 controls the operation of the solenoid 239. Each of the selector buttons 265, 269, and 272 controls the operation of the solenoid 240.

In the set-up shown in Fig. 1, the selector buttons 263, 264, 265, 267, 269, 270, and 271 are in the "on" position, while the selector buttons 268 and 272 are in the "off" position. Hence, during the stage of hardening controlled by the timer 260, the full volume of quenching liquid flows through the three solenoid-operated valves 235, 236, and 237 to quench the work drastically; during the stage of hardening controlled by the timer 261, a reduced volume of quenching liquid flows over the work through the solenoid-operated valves 235 and 237 to gradually cool the work in such way as to obtain the desired molecular structure; and during the stage of hardening of the timer 262, a somewhat increased volume of oil flows over the work through the solenoid-operated valves 235 and 236 to cool the work rapidly to a temperature where it can readily be handled by the operator.

Figures 7, 8:
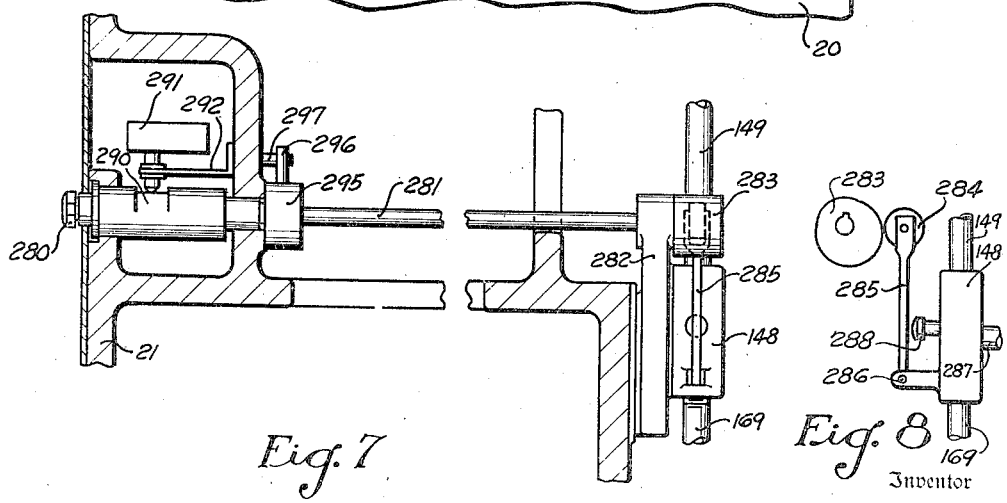
Fig. 7 is a fragmentary sectional view, showing the mechanism for selecting whether the press is to be automatically or manually operated.
Fig. 8 is a view at right angles to Fig. 7, showing further details of these parts.

As already stated, in setting up the machine and particularly in determining the position of the bracket 216 on the rod 212 (Fig. 6), it is desirable that the movements of the piston 34 be manually controlled; but in the normal operation of the machine the movements of this piston and the full cycle of operation of the press are automatic. A selector knob 280 (Figs. 1 and 7) is provided which can be adjusted manually to determine whether the machine is to operate automatically or manually. This selector knob 280 controls the position of the three-way valve 148 (Fig. 11). The selector knob is secured to the front end of a shaft 281 which is journaled in the column 21, and in a bracket 282 that is secured to the column. To the rear end of the shaft 281 there is secured a cam or eccentric 283 (Figs. 7 and 8). This cam engages a roller 284 which is secured on a lever 285 that is pivoted at one end through the pin 286 on the casing of the three-way valve 148. The lever 285 is adapted to engage the plunger 288 of the valve, as the cam 283 is revolved. The plunger is spring-pressed outwardly to hold the valve normally in the "automatic" position, shown diagrammatically in Fig. 11, to connect the ducts 147 and 149. When the cam is revolved, however, the lever 285 is swung about its pivot 286 to press the plunger 288 inwardly to connect duct 147 with exhaust duct 289.

The shaft 281 is of enlarged diameter toward its front end and there is an arcuate slot 290 cut part way around its periphery, the bottom of which is eccentric of the axis of the shaft. A normally open limit switch 291 is mounted in the column 21 on an angle-plate 292 in such position that the plunger of the limit switch may engage the recessed portion 290 of the shaft 281. When the shaft 281 is rotated from the position shown in Figs. 7 and 8, then, not only is the three-way valve 148 shifted to position for automatic operation but the limit switch 291 is also closed. A pin 296, which projects from a collar 295, that is secured to the shaft 281, and which is adapted to engage a pin 297, that is secured in the column 21, serves to limit rotary movement of the shaft 281.

Figure 12:
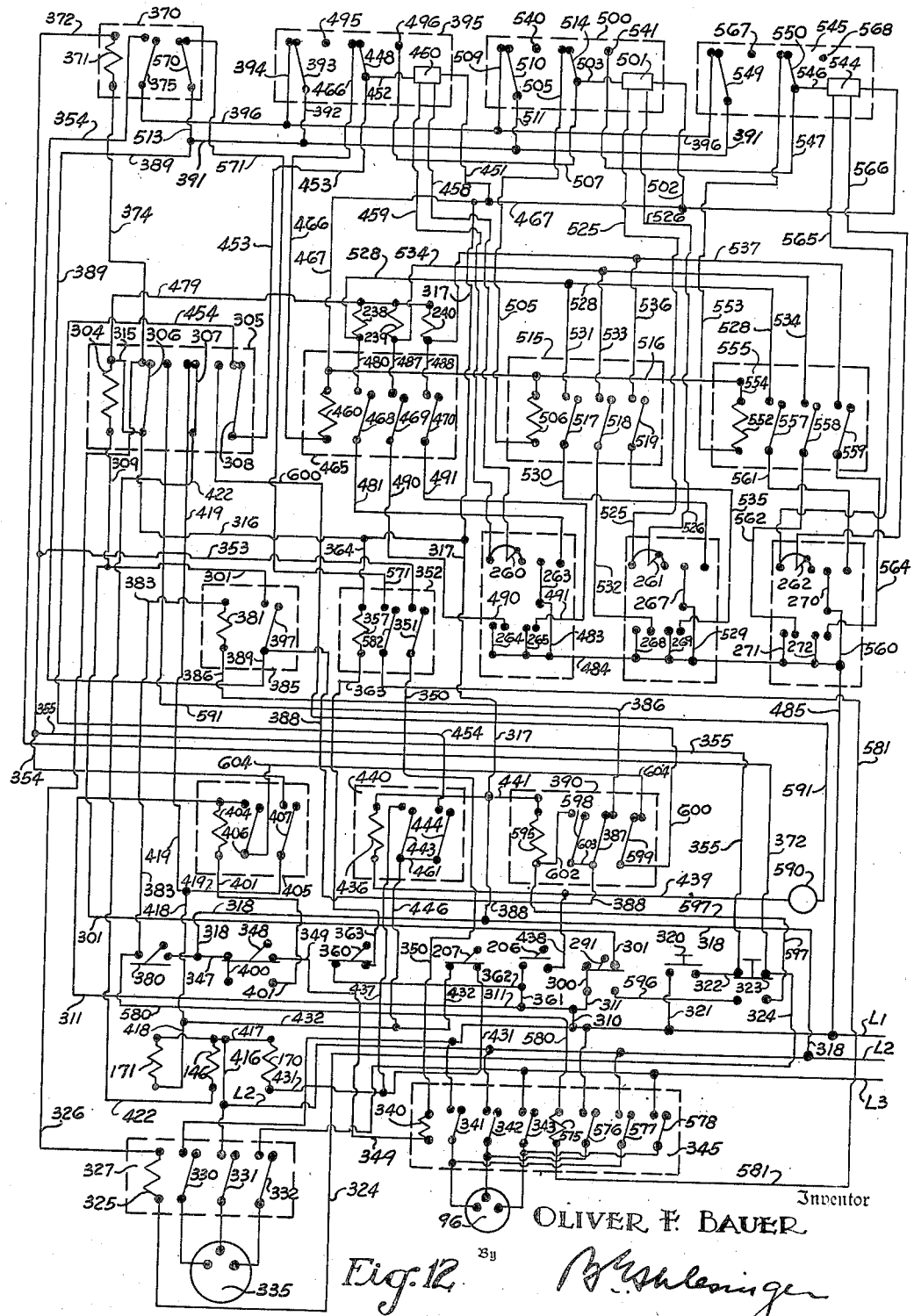
Fig. 12 is a diagram showing one way in which the press may be wired electrically to perform its functions.

One way in which the machine may be wired electrically to accomplish its purpose is illustrated diagrammatically in Fig. 12.

The three timers, which control the time of operation of the three stages of the quenching operation, are shown at the top of this diagram at 395, 500, and 545. These timers may be of any standard or suitable construction. One of the relays employed in the functioning of the press is also shown on the top line of the diagram. This relay is denoted at 370.

Reading down from the top of the diagram, the next important parts shown diagrammatically are the solenoids 238, 239, and 240 which control the volume of the quenching liquid flowing to the work; see Fig. 2. Below these, are four relays 305, 465, 515, and 555. Below the relays 305 and 465 are the relays 385 and 352, while below the relays 515 and 555 are illustrated diagrammatically the three groups of selector and timer buttons contained within the panel at the left hand side of the front of the machine; see Fig. 1. Below these are illustrated three additional relays 405, 440, and 390. Below these are shown the several limit switches 380, 348, 360, 207, 206, and 291; the starter button 320, and the stop button 323. Below the limit switches 380 and 348 are shown the solenoids 171, 146, and 170 (Fig. 11) which control the movements of the piston 34. Below these are shown the controller 321 and the motor 335 which drives the quenching oil pump 228 (Fig. 2). Below the limit switches 207, 206, and 291 are shown the controller 345 and the motor 96 (Fig. 2) which drives the mechanism for moving the bracket from loading to operative position and vice versa. The several relays 370, 305, 465, 515, 555, 385, 352, 405, 440, and 390 may be of any standard or suitable construction. Likewise, the controllers 345 and 327 may be of any standard or suitable construction.

Assuming that the selector knob 280 (Figs. 1 and 7) has been moved to automatic position, then the limit switch 291 will be in a position shown in Fig. 12, connecting the lines 300 and 301. This causes the coil 304 of the relay 305 to be energized, causing the switch arms 306, 307, and 308 of the relay to assume the positions shown in Fig. 12. The circuit to the coil 304 is from the main line L1 through the lines 310, 311, and 300, limit switch 291, lines 301 and 309, coil 304, and lines 315, 316, 317, and 318 to main line L2.

The machine is now ready for operation. When the operator pushes in the starting button 320, a circuit is made from the main line L1 through the line 321, starter button 320, line 322, stop button 323, line 324, coil 325 of controller 327, line 326, switch arm 306 of relay 305, and lines 316, 317, and 318 back to main line L2. This energizes the coil 325 of the controller 327, pulling in the switch arms 330, 331, and 332 of this controller and starting the motor 335 which drives the pump 228 (Fig. 2) for the quenching fluid.

Simultaneously, the coil 340 of controller 345 is energized, causing the switch arms 341, 342, and 343 to be pulled in, to start the motor 96 which operates the mechanism which swings the bracket 82 (Fig. 2). The circuit to the coil 340 is from the main line L2 through the lines 318 and 347, the limit switch 348 (Fig. 5), the line 349, the coil 340, the line 350, the switch arm 351 of relay 352, the lines 353, 354, 355, and 322, the start button 320, and line 321 to line L1. The switch arm 351 is at this time closed because the coil 357 is at this time energized and the coil 357 is at this time energized because the limit switch 360 is at this time held closed by the angle plate 88 (Fig. 2) carried by the bar 95. The circuit to the coil 357 is from the main line L1 through the lines 310, 311, 361, and 362, the limit switch 360, the line 363, the coil 357, and the lines 364, 316, 317, and 318, to the main line L2.

Simultaneously with the energizing of the coils 325 and 340, respectively, the coil 371 of the relay 370 is energized. The circuit to this coil is from the main line L1 through the line 321, the starting button 320, the line 322, the stop button 323, the line 372, the coil 371, the line 374, switch arm 306 of relay 305, and lines 316, 317, and 318 to main line L2. With the coil 371 energized, the switch arm 375 of relay 370 is pulled in, and the switch arm 570 of this relay is pulled out. The starting button 320 must be held by the operator in long enough for the bracket 82 to start from loading into working position.

As soon as the bracket starts to move, the limit switch 380, which has been held open by the pin 176 (Fig. 5) is released, and this limit switch, which is normally closed, closes. A circuit is then made to the coil 381 of the relay 385 from the main line L2 through the lines 318 and 347, the limit switch 380, the line 383, the coil 381, the line 386, the switch arm 387 of relay 390, the lines 388, 389, 391, and 392, the switch arm 393, the lines 394 and 396, the now closed switch arm 375, the lines 354, 355, and 322, the starter button 320, and the line 321 to the main line L1.

The continued energization of the coils 371 and 381 is necessary to keep the coils 325 and 340 of the controllers 327 and 345 energized, that is, to keep the motors 335 and 96 running.

After the starter button 320 is released, the circuit to the coil 371 is maintained from the main line L2 through the lines 318, 317, and 316, the switch arm 306 of relay 305, the line 374, the coil 371, the line 372, stop button 323, the lines 355 and 354, the switch arm 375 of relay 370, the lines 396 and 394, switch arm 393 of timer 395, the lines 392, 391, and 389, the now closed switch arm 397 of relay 385, the line 301, the limit switch 291, the lines 300, 311, and 310 to the main line L1. The circuit to the coil 381 is maintained, after the start button has been released, from the main line L1 through the lines 310, 311, and 300, the limit switch 291, the line 301, the switch arm 397 of relay 385, the line 388, the switch arm 387 of relay 390, the line 386, the coil 381, the line 383, the now-closed limit switch 380, the line 347, and the line 318 back to the main line L2. The circuit to the coil 325 is maintained from the main line L1 through the lines 310, 311, and 300, the switch 291, the line 301, the switch arm 397 of relay 385, the lines 389, 391, and 392, the switch arm 393, the lines 394 and 396, the switch arm 375, the lines 354 and 355, the stop button 323, the line 324, the coil 325, the line 326, the switch arm 306 of relay 305 and the lines 316, 317, and 318 to the main line L2. The circuit to the coil 340 is maintained from the main line L1 through the lines 310, 311, and 300, the limit switch 291, the line 301, the switch arm 397, the lines 389, 391, and 392, the switch arm 393, the lines 394 and 396, the switch arm 375, the lines 354 and 355, the stop button 323, the line 372, the coil 371, the line 374, the switch arm 306, and the lines 316, 317, and 318, back to the main line L2.

When the bracket 82 reaches working position, the pin 176 (Fig. 5) carried by the crank-plate 100 strikes the plunger of the limit switch 348 causing this limit switch to break the connection between the lines 347 and 349 and to connect the lines 400 and 401. The breaking of the connection between the lines 347 and 349 stops the bracket motor 96 while the making of the connection between the lines 400 and 401 energizes the coil 404 of relay 405, causing the switch arms 406 and 407 to be closed. The circuit to the coil 404 is from the main line L1 through the lines 310 and 311, the coil 404, the line 401, the now-shifted limit switch 348, and the lines 400, 347, and 318 to the main line L2.

This energizes the solenoids 146, 170, and 171 (Fig. 11). The circuit to the solenoid 171 is made from the main line L2 through the lines 416 and 417, the solenoid 171, the lines 418 and 419, the switch arm 407 of relay 405, the line 354, the switch arm 375 of relay 370, the lines 396 and 394, the switch arm 393, the lines 392, 391, and 389, the switch arm 397, the line 301, the limit switch 291, and the lines 300, 311, and 310 to the main line L1. The circuit to the solenoid 146 is from the main line L2 through the lines 416 and 417, the solenoid 146, the line 422, the switch arm 307, the line 419 and thence as described for the solenoid 171 to the main line L1. The circuit to the solenoid 170 is from the main line L2 through the lines 416 and 417, the solenoid 170, the line 431, the limit switch 207, the line 432, the line 419, and thence as described for the solenoid 171 to the main line L₁.

When the solenoids 170 and 171 are energized, the valves 172 and 173 (Fig. 11) are opened, and when the solenoid 146 is energized, the valve 145 is closed. This permits the compressed air to be supplied to the upper end of the piston 34, forcing the piston downward to operating position. The valve 145 is normally spring-pressed to open position so that if the power should fail the piston 34 will return to its upper position. This safety feature prevents injury to the workman in case of power failure.

As the piston 34 descends, the cam 52 (Fig. 6) holds the limit switch 207 closed until the piston is near the end of its downward stroke. Then the roller 218 rides up the beveled nose 54 of the cam surface onto the dwell portion 55. This causes the lever 209 to be moved to its intermediate position, as already described, and permits the limit switch 207 to open which de-energizes the solenoid 170 (Fig. 11) and allows the valve 172 to close. This shuts off the flow of the pressure fluid through the line 184 and causes the pressure fluid to flow to the upper face of the piston 34 through the restricted opening of the needle valve 186. Thus, the speed of descent of the ram is slowed up.

When the piston 34 approaches the end of its downward stroke and the upper die 47 (Fig. 3) is in operative engagement with the work, the roller 218 (Fig. 6) rides up on the bevel portion 56 of cam 52 onto the dwell portion 57. This causes the lever 209 to close the limit switch 206 (Figs. 6 and 12). This energizes the coil 436 of the relay 440. The circuit to this coil 436 is from the main line L₁ through the lines 310, 311, and 361, limit switch 206, lines 438 and 439, coil 436, and lines 441, 317, and 318 back to main line L₂. This closes the switch arms 443 and 444 of relay 440.

The closing of switch arm 443 reestablishes a circuit to solenoid 170 (Fig. 11), and valve 172 is opened again. Thus full pressure is again put on the upper face of piston head 36, causing the upper die 47 to clamp the work firmly and securely. The circuit to the solenoid 170 is from main line L₂ through lines 416 and 417, the solenoid 170, lines 431 and 437, switch arm 443, lines 446, 432, 418, 419, switch arm 407 of relay 405, line 354, switch arm 375 of relay 370, lines 396 and 394, switch arm 393, lines 392 and 389, switch arm 397 of relay 385, line 301, limit switch 291, and lines 300, 311, and 310 to main line L₁.

The closing of switch arm 444 of relay 440 establishes a circuit to the timing mechanism of timer 395, the circuit being made from the main line L₂ through the lines 318, 317, 467, and 451, the mechanism 450, the lines 452 and 453, the switch arm 308 of relay 305, the line 454, the switch arm 444 of the relay 440, the lines 461, 446, 432, 418, and 419, the switch arm 407 of relay 405, and the line 354 back to the main line L₁ in same manner as the circuits to the solenoids 146 and 170. The time of operation of the timer 395 is determined by the setting of the potentiometer switch 260 (Figs. 1 and 12) which is connected to the timer by the lines 458 and 459.

When the switch arm 444 of relay 440 is closed, the coil 460 of relay 465 is also energized. The circuit of this coil is made from the main line L₁ through the lines 310, 311, and 300, the limit switch 291, the line 301, the switch arm 397, the lines 389, 391, and 392, the switch arm 393, the lines 394 and 396, the switch arm 375, the line 354, the switch arm 407, the lines 419, 418, 432, 446, and 461, the switch arm 444, the line 454, the switch arm 308, the line 453, the switch arm 448, the line 466, the coil 460, and the lines 467, 317, and 318 back to the main line L₂.

This pulls in the switch arms 468, 469, and 470 of relay 465. Thus circuits are made possible to the solenoids 238, 239, and 240 (Fig. 2) that operate the valves 235, 236, and 237, respectively, which control the supply of the quenching fluid to the work. Whether these circuits are actually closed or not depends on whether the selector buttons 263, 264, and 265 (Fig. 1) are adjusted to their "on" or "off" positions. The circuit to the solenoid 238 is made from the main line L₂ through the lines 318, 317, 316, 315, and 479, the solenoid 238, the line 480, switch arm 468, the line 481, the manually adjustable switch arm 263, if that switch arm is in the "on" position, the lines 483, 484, and 485 to the main line L₁. In similar manner, the circuits to the solenoids 239 and 240, respectively, are made if the manually operable switch arms 264 and 265 are in the "on" position, the switch arm 264, when in the "on" position, connecting the line 484 with the line 479 through the solenoid 239, line 487, switch arm 469 and line 490, while the switch arm 265 when in "on" or closed position connects the line 484 with the line 479 through the solenoid 240, line 488, switch arm 470 and line 491. If one of the switch arms 263, 264, or 265 is left in its "off" position, the corresponding solenoid 238, 239, or 240 is not energized, and the corresponding valve 235, 236, or 237 (Fig. 2) is not opened during the time of operation of the timer 395.

Thus the volume of oil flowing to the work during the operation of the timer 395 depends on the setting of the selector buttons or switch arms 263, 264, and 265. As shown in Fig. 1, as already stated, all three of these switch arms are in the "on" or closed position, so during operation of timer 395, all of the valves 235, 236, and 237 are open and the maximum volume of quenching liquid flows over the work.

After the timer 395 has functioned for the period of time determined by the manual adjustment of the potentiometer button or switch 260 (Figs. 1 and 12) the timer mechanism 450 operates to break the connection of the switch arms 393 and 448 with the lines 394 and 466, respectively, allowing these arms to make engagement with the terminals 495 and 496. This causes the circuit to be made to the timer mechanism 501 of timer 500, and sets that timer mechanism in operation. This circuit is from the main line L₂ through the lines 318, 317, and 467, the line 502, the timer mechanism 501, the lines 503 and 507, the switch arm 448, the line 453, the switch arm 308, the line 454, the switch arm 444 of relay 440, the lines 461, 446, 432, 418, and 419, the switch arm 407, the line 354, the switch arm 375, the lines 396 and 509, the switch arm 510, the lines 511, 391, 513, and 389, the switch arm 397, the line 301, the limit switch 291, the lines 300, 311, and 310 to the main line L₁.

Simultaneously, the coil 506 of the relay 515 is energized, this coil being connected at one side through the lines 516, 467, 317, and 318 with the main line L₂, and being connected on the opposite side with the line L₁ through the line 505, switch arm 514, and line 507 and switch arm 448 in the same manner as already described for the circuit to the timer 501. The energized coil 506 pulls in the switch arms 517, 518, and 519 of relay 515. These make circuits to the solenoids 238, 239, and 240, respectively (Figs. 2 and 12), if the manually adjustable switch arms 267, 268, and 269, respectively (Figs. 1 and 12) are closed.

Thus, if the switch arm or button 267 is in "on" or closed position, a circuit is closed from main line $L_1$ through lines 485, 484, and 529, switch arm 267, line 530, switch arm 517, lines 531 and 528, solenoid 238, lines 479, 315, 316, 317, and 318 to main line $L_2$. In similar manner if the switch arm or button 268 is in "on" or closed position, a circuit is made through solenoid 239 between line 484, which is connected with main line $L_1$, as just described, and line 479, which is connected, as just described with main line $L_2$; this circuit being through switch arm 268, line 532, switch arm 518 of relay 515, lines 533 and 534, and solenoid 239.

Likewise, if switch arm or button 269 is in "on" or closed position, a circuit is made through solenoid 240 between line 484 and line 479, this circuit being through switch arm 269, line 535, switch arm 519 of relay 515, lines 536 and 537 and solenoid 240.

Thus, during operation of the timer 500, the volume of quenching liquid flowing over the work is determined by which of the switch arms 267, 268, and 269 are in the "on" or closed position. In the set-up illustrated in Fig. 1, only the switch arms 267 and 269 are in the "on" position, and therefore during operation of timer 500, only the solenoids 238 and 240 will be energized and only the valves 235 and 237 (Fig. 2) will be open.

The length of time of operation of the timer 500, is governed by the setting of the potentiometer switch or selector button 261 (Figs. 1 and 12). This switch is connected with the timer mechanism 501 by lines 525 and 526.

After the timer 500 has functioned for the predetermined period of time, the timer mechanism 501 operates to break the connection of the switch arms 510 and 514 with the lines 509 and 505, respectively, allowing these arms to make contact with the terminals 540 and 541, respectively. The contact of switch arm 514 with terminal 541 closes a circuit to the timer mechanism 544 of the timer 545 and sets that timer mechanism in operation. This circuit is from the main line $L_2$ through lines 318, 317, and 467, the timer mechanism 544 of timer 545, lines 546 and 547, the now shifted switch arm 514 of timer 500, the line 507, the now shifted switch arm 448 of timer 395, the line 453, the switch arm 308 of relay 305, the line 454, the switch arm 444 of relay 440, the lines 461, 446, 432, 418, and 419, the switch arm 407 of relay 405, the line 354, the switch arm 375 of relay 370, the line 396, the switch arm 549 of timer 545, the lines 391, 513, and 389, the switch arm 397 of relay 385, the line 301, the limit switch 291, and the lines 300, 311, and 310 to the main line $L_1$.

Simultaneously the coil 552 of the relay 555 is energized, this coil being connected at one side through the line 553 and switch arm 550 with the line 547 and being connected on the other side through the line 554 and line 516 with the line 467, the circuit to the coil 552 being otherwise made as described for the timer mechanism 544.

The energized coil 552 pulls in the switch arms 557, 558, and 559 of relay 555. Circuits are thereby made to whichever of the solenoids 238, 239, and 240 (Figs. 2 and 12) it is desired be energized at this stage of the hardening operation, the selection depending upon the settings of the selector buttons 270, 271, and 272 (Fig. 1).

If the selector button 270 is adjusted, for instance, to its "on" position, a circuit is closed between the main line $L_1$ and one side of the solenoid 238 through the lines 485 and 560, the switch arm 270, the line 561, the switch arm 557, and the line 528. If the switch arm or selector button 271 is in its "on" or closed position, a circuit is completed from the line $L_1$ through the lines 485 and 484, the switch arm 271, the line 562, switch arm 558, and line 534, to one side of the solenoid 239. If the selector button or switch arm 272 is in its "on" position, a circuit is made from the main line $L_1$ through the lines 485 and 484, the switch arm 272, the line 564, the switch arm 559, and the line 537 to one side of the solenoid 240. The opposite sides of the several solenoids 238, 239, and 240 are connected, as already described, to the line $L_2$ through the lines 479, 315, 316, 317, and 318.

In the set-up illustrated in Fig. 1, the selector buttons or switch arms 270 and 271 are in the "on" position, while the selector button 272 is in the "off" position. Therefore during operation of the timer 545, the solenoids 238 and 239 are energized, while the solenoid 240 remains deenergized. The valves 235 and 236 (Fig. 2) will, therefore, be open during operation of the timer 545, while the valve 237 will remain closed.

With the set-up illustrated in Fig. 1, therefore, the volume of quenching liquid flowing to the work will be greater during the period of operation of the timer 545 than during the period of operation of the timer 500, but will be less than during the period of operation of the timer 395. With the set-up illustrated in Fig. 1, then, the work will be flooded with the maximum volume of quenching liquid for a period determined by the setting of the potentiometer switch or button 260, then a reduced volume of liquid will flow over the work for a period of time determined by the setting of the potentiometer switch or button 261, and finally a somewhat increased volume of liquid, as compared with the rate of flow during the second stage, will flow over the work for whatever period is selected through setting of the potentiometer switch or button 262.

The potentiometer switch is connected to the timer mechanism 544 of timer 545 by the lines 565 and 566. When the timer mechanism trips, at the end of the period for which the button 262 is adjusted, the connection of the switch arms 549 and 550 with the lines 396 and 553, respectively, is broken, allowing these arms to make contact with the terminals 567 and 568.

The circuits to the solenoids 146, 170, and 171 (Figs. 11 and 12) have been maintained during the successive operation of the timers 395, 500, and 545 by connection of the switch arms 393, 510, and 549 successively with the lines 394, 509, and 396, respectively. When the switch arm 549 is moved, therefore, to break the connection between the lines 396 and 391, the solenoids 146, 171, and 170 are deenergized. The circuit to the coil 325 is also broken, stopping the pump drive motor 335. At the same time, the circuit to the coil 371 of relay 370 is broken, causing the switch arm 375 to break the connection between the lines 354 and 396, and causing the switch arm 570 to make connection between the lines 513 and 571.

The deenergizing of the solenoids 146, 171 and 170 causes the valve 145 (Fig. 11) to open and the valves 172 and 173 to close. The upper face of the pistonhead 36 is therefore put on exhaust through the valve 145 while the lower side is given full pressure through shifting of the shuttle valve 121 back to the position shown in Fig. 11, as previously described. The piston 34 is, therefore moved to its upper position, disengaging the die from the work. As the piston ascends, the lever arm 209 (Fig. 6) is rocked clockwise releasing the pushrod 208 of the limit switch 206, and this limit switch opens. When the piston 34 reaches its uppermost position, the lever arm 209 closes the limit switch 207.

As soon as the piston 34 reaches its uppermost position, the pistonhead 36 strikes the angle plate 76 (Fig. 3) causing the arms 93 (Figs. 2 and 3) and arms 91 to be moved upwardly, causing the bracket 82 to be lifted off its seat 112 (Figs. 2 and 4) and causing the angle plate 88 to close the limit switch 360 (Figs. 2 and 12). The closing of the limit switch 360 energizes the coil 351 of relay 352 in the manner already described, thus pulling in the switch arms 582 and 351 of this relay. This action energizes the coil 575 of the controller 345, causing the switch arms 576, 577, and 578 to be pulled in, starting the bracket motor 96 in a direction to cause the bracket 82, which carries the work, to move out to loading position. The circuit to the coil 575 is from the main line L₂ through the lines 318 and 347, the now-closed limit switch 380, the line 580, the coil 575, the line 581, the now-closed switch arm 582 of relay 352, the line 571, the switch arm 570, the lines 513 and 389, the switch arm 397, the line 301, the limit switch 291, and the lines 300, 311, and 310 to the main line L₁.

When the bracket reaches the out or loading position, the pin 176 (Fig. 5) carried by the crank plate 100 engages the normally closed limit switch 380 and forces this switch open, stopping the bracket motor 96, for this breaks the circuit to the coil 575. The work is now at loading position and the whole machine is stopped. To restart the machine, it is necessary again to press the start button 320.

If for any reason, the bracket motor 96 should fail before the bracket 82 has reached its full out position, the bracket will stop, but if the power should come back on again, the bracket will not restart, because when the power fails, the circuit to the coil 381 of the relay 385 is broken, the switch arm 397 opens, and the circuit to the coil 381 can not be made again without pushing in the start button 320. Thus the operator of the machine is absolutely protected against injury during operation of the machine.

In setting up the machine, it is necessary to adjust the position of the bracket 216 along the rod 212 (Fig. 6) so as to determine the point in the down stroke of the piston 34 where down stroke will end and full pressure be put on the work. In this simultaneously, the point where the rate of the piston is slowed down to prevent the upper die from striking the hot workpiece at high speed is determined.

In order to adjust the piston stroke, the operator first throws the selector knob 280 over to the manual operating position. This causes the limit switch 291 (Figs. 7 and 12) to break the connection between the lines 300 and 301 and make connection between the lines 311 and 596. The breaking of the connection between the lines 300 and 301 deenergizes the relay 305, preventing the starting of the pump motor 335 and the closing of relay 370.

In the normal non-working position of the press, the piston 34 (Fig. 3) is in its uppermost position and the bracket 82 in its out or loading position. Before the stroke of the piston can be adjusted, then, it is necessary to move the bracket 82 to its "in" or operative position.

In the "up" position of the piston, the limit switch 360 is held closed by the angle plate 88 (Fig. 2) and the coil 351 is energized, closing the switch arms 582 and 351, as already described with reference to the automatic operation of the machine. When the starter button 320 is pushed in, then, a circuit is made from main line L₁ through line 321, starter button 320, lines 322, 355, 354, and 353, switch arm 351, line 350, coil 340 of controller 345, line 349, limit switch 348, and line 318 to main line L₂. This energizes the coil 340 of controller 345 to pull in the switch arms 341, 342, and 343 and starts the bracket drive motor 96. Since switch arm 375 of relay 370 is now open, the starter button must be held closed in order for the bracket-motor 96 to run and move the bracket 82 toward operative position.

As the bracket moves into operative position, the pin 176 (Fig. 5) rotates away from the plunger of limit switch 380, permitting this limit switch to close. When the bracket 82 reaches operative position, the pin 176 strikes the plunger of limit switch 348 and shifts this switch to disconnect lines 347 and 349 and connect lines 400 and 401 as already described.

In order that the piston 34 may descend, the valve 145 (Fig. 11) must be closed and the valve 173 must be open, that is, the solenoids 146 and 171 must be energized. When the piston 34 is in its "up" position and the bracket 82 is in its "in" or working position, the coil 404 of relay 405 is energized, a circuit to this coil being made from the main line L₁ through the lines 310, 311, the coil 404, the line 401, the now-shifted limit switch 348, and the lines 400, 347, and 318 to the main line L₂. This causes the switch arms 406 and 407 of relay 405 to be closed. Thus, when the piston 34 is in its "up" position and the bracket 82 is in working position, the solenoid 146 is energized, the circuit to the solenoid being made from the main line L₂ through the lines 416 and 417, the solenoid 146, the line 422, the switch arm 307, which now connects lines 422 and 600 because coil 304 is deenergized by shift of limit switch 291 (Figs. 7 and 12) to "manual" position, the line 600, the switch arm 599 of relay 390, the line 604, the now-closed switch arm 406 of relay 405, and the lines 311 and 310 to main line L₁.

If the starter button 320 is at this time closed, circuits are also made to the solenoids 171 and 170. The circuit to solenoid 171 is from the main line L₁ through the line 321, the starter button 320, the lines 322, 355, and 354, the switch arm 407 of relay 405, the lines 419 and 418, the solenoid 171, the line 417, and the line 416 to the main line L₂. The circuit to solenoid 170 is from main line L₁ to line 418 exactly as just described for solenoid 171 and thence through line 432, limit switch 207, line 431, coil 170, and lines 417 and 416 to main line L₂.

With the solenoids 146, 170, and 171 energized, the valves 174 and 173 (Fig. 11) are opened and the valve 145 is closed, so that the piston 34 descends rapidly, and will continue to so descend until roller 218 of bracket 216 strikes the portion 54 of cam 52. The operator may determine where he wants to set the bracket 216 (Fig. 6), which carries the roller 218, by watching the light 590 (Fig. 12) which may be located at any convenient point on the machine. This light is so connected as to be operated by the limit switch 206 (Fig. 6) when that limit switch is closed, which means that the light is illuminated when the piston 34 is at the selected end of its down stroke when full pressure is put on the upper die. The circuit to the lamp is made from the main line L₁ through the lines 310, 311, and 361, the limit switch 206, the lines 438 and 439, the light 590, the line 591, the now-shifted switch arm 306 of relay 385, and the lines 316, 317, and 318 to the main line L₂.

Should the operator desire to stop the downward descent of the piston 34 at any point, he simply releases the start button 320. This breaks the circuits to the solenoids 170 and 171, allowing the valves 174 and 173 (Fig. 11) to close, shutting off the supply of the pressure fluid to the top side of the piston head 36. The solenoid 146 remains energized, however, that is, the valve 145 remains closed. The piston 34 will, therefore, settle slowly until the pressure on the under face of the piston head 36 brings the piston to a stop.

If the operator desires to bring the piston to a quick stop, he not only releases the start button 320, but he presses in the stop button 323. This causes the coil 595 of the relay 390 to be energized, shifting the switch arm 599 of that relay and breaking the circuit to the solenoid 146. This causes the solenoid to be deenergized, allowing the valve 145 (Fig. 11) to open, thus putting the upper side of the pistonhead 34 on exhaust.

The circuit to the coil 595 is from the main line L₁ through the lines 310 and 311, the limit switch 291, which is now in the "manual" position connecting the line 311 with the line 596, the line 596, the stop button 323, the line 597, the coil 595, and the lines 441, 317, and 318 to the main line L₂. Thus, as stated, the switch arm 599 of the relay 390 is shifted and the switch arm 598 is closed.

If the operator desires to return the piston 34 to its "up" position, he simply continues to hold his finger on the stop button 323. When the piston reaches uppermost position, the angle plate 88 contacts and closes limit switch 360 (Figs. 2, 3, and 12), thus making a circuit to the coil 357 of relay 352. This circuit is made in the same way as already described for the automatic operation of the machine. This closes the switch arms 582 and 351 of the relay.

If the stop button is held in long enough, a circuit is made from the main line L₁ through the lines 310 and 311, the limit switch 291, the line 596, the stop button 323, the line 597, the line 602, the switch arm 598, the lines 603, 388, 389, and 513, the switch arm 570, the line 571, the switch arm 582, the line 581, the coil 575 of the controller 345, the line 580, the now-closed limit switch 380, the line 347, and the line 318 to the main line L₂. This starts the bracket motor 96 (Figs. 2 and 12) and causes the bracket 82 to be swung out to loading position, so that the operator can position or remove the workpiece.

By pressing the starter and stop buttons, then, the operator can manually control the operation of the press, and can jog the piston 34 up or down to adjust the bracket 216 very precisely along the rod 212 in accordance with the height and type of work to be hardened.

Figure 9:
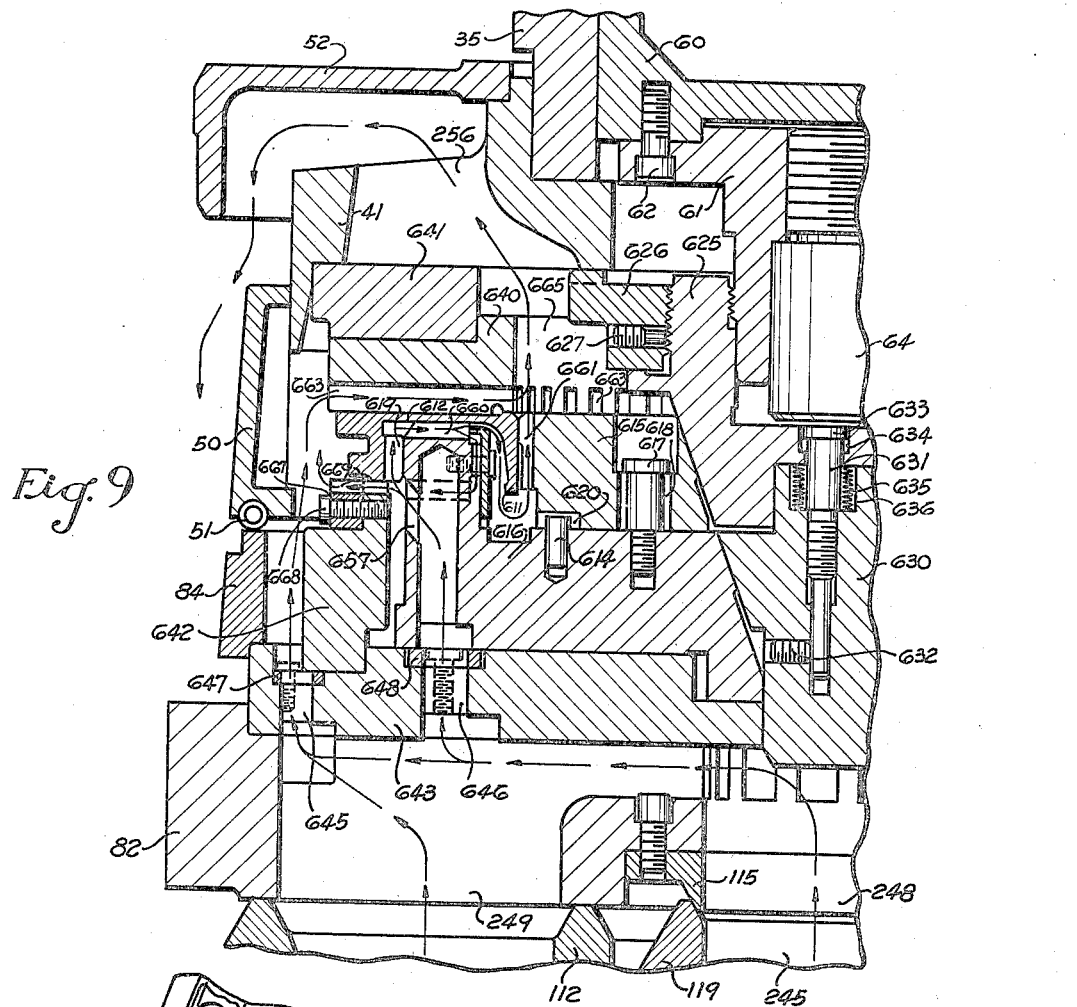
Fig. 9 is a fragmentary enlarged sectional view similar to Fig. 4 but showing somewhat different forms of upper and lower dies for holding a different type of gear and showing also a somewhat different type of mechanism for centering and holding the work against radial distortion.
Figure 10:
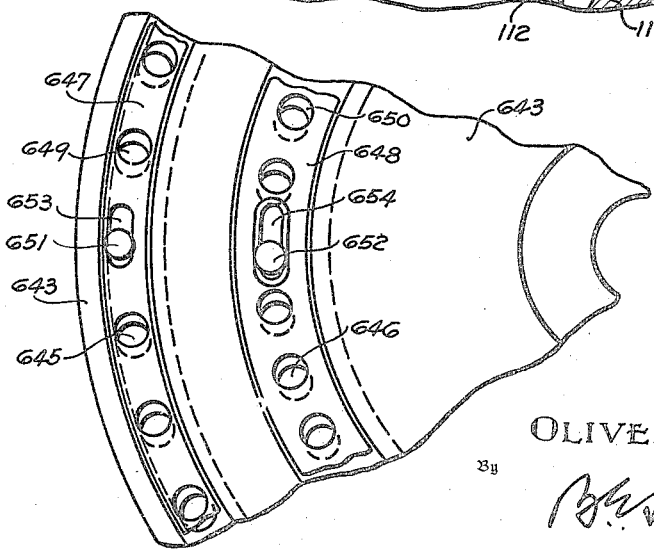
Fig. 10 is a fragmentary plan view of the lower die used in the mechanism of Fig. 9.

It will be obvious that the quenching press of this invention may be employed in the hardening of various articles. For each different job, an upper and a lower die and an expander of suitable shape and size will be employed. Figures 9 and 10 illustrate the type of holding mechanism which might be employed in the hardening of a well known design of internal gear I. This gear has internal teeth 619 at its perimeter and integral therewith and spaced radially inwardly therefrom a circular bearing portion 611 which is connected with the toothed portion 619 by a web 612.

In a gear of this type it is necessary not only to hold the toothed portion 619 against distortion but also to hold the bearing portion 611 against distortion. For this purpose, two different sets of gripper segments and two different expanders are employed. The gripper segments of one set are denoted at 615 and the gripper segments of the other set at 616. The lower set of gripper segments 616 are shaped to have external surfaces to about the tips of the teeth 619 and to have upper surfaces on which the web portion 612 of the gear may rest. The gripper segments 615 of the upper set are adapted to engage at their peripheries the bore of the bearing portion 611 of the gear. The latter segments are connected to the segments 616 by screws 617 which pass through slots 618 in the segments 615 and which thread into the segments 616. The segments 615 are guided in their radial movements on the segments 616 by the screws 617 and by dowel pins 614 that are secured in the segments 616 and that pass through radial slots 620 formed in the under faces of the segments 615.

For expanding the segments 615 to engage the internal bearing surface 611 of the gear an expander 625 is provided. This expander is threaded on the nose of the plate 61. As in the previously described embodiment of the invention, this expander 625 has a tapered conical nose which engages the internal conically bored surfaces of the gripper segments 615 to force these segments outwardly, when the ram 34 is lowered, thus holding the bearing surface 611 of the gear against distortion during the hardening operation.

The expander segments 616 are operated by an expander 630. The expander 630 is intended to have limited axial movement with reference to the expander 625. For this purpose, stop-pins 631 are provided which thread into the expander 630 and are secured therein by set screws 632. The heads 633 of these pins 631 are adapted to seat in recesses 634 formed in the nose of the expander 625. Coil springs 635, which surround the pins 631 and are seated in recesses 636 in the expander 630 and are adapted to engage the lower end face of the expander 625, serve to normally press the expander 630 away from the expander 625 to the limit permitted by the heads 633 of the pins 631.

For holding the upper face of the work against distortion during the hardening operation an upper die 640 of suitable shape is provided. This is secured in any suitable manner to a plate 641 which in turn is fastened to the plate 41. For holding the lower surface of the toothed portion 619 of the gear against distortion during hardening a suitable lower die 642 is provided. This is secured in any suitable manner to a ring 643 which in turn is secured in any suitable manner to the bracket plate 82. The plate 643 has a plurality of circumferentially spaced openings 645 near its periphery and a second set of circularly arranged equi-spaced openings 646 closer to its center.

In suitable circular recesses in the upper face of the plate 643 are mounted two rings 647 and 648 (Figs. 9 and 10). These rings are provided with holes 649 and 650, respectively, which communicate with the holes 645 and 646 in the plate 643. The rings 647 and 648 are secured to the plate 643 by screws 651 and 652, respectively, which pass through elongated slots 653 and 654, respectively, formed in the rings and which thread into the plate 643.

The parts are shown in Fig. 9 in the positions which they occupy when the piston 34 is in its lowermost position and the work is held securely by the upper and lower dies and expander segments. As the piston 35 descends to this position, the segments 616 are first forced against the internal toothed portion 619 of the work by engagement of the tapered nose of the expander 630 with the internal tapered surfaces of the expander segments. Then as the piston descends further, the expander 625 is forced into engagement with the bore of the segments 615 and these segments are forced into engagement with the internal bearing surface 611 of the work, the expander 625 moving relative to the expander 630 through operation of the springs 635. Thus the work is held rigidly both at the tips of its teeth and in its bore.

When the quenching fluid comes on, it flows as shown by the arrows in Fig. 9 through the radial slots 249 in the bracket plate 82 and upwardly through the openings 645 and 646 in the plate 643, and through the openings 649 and 650 in the rings 647 and 648, respectively. Thence the quenching liquid flowing from the holes 650 flows upwardly and outwardly through holes 657 drilled in the segments 616, through the teeth 619 of the gear and thence through slots 660 in the upper face of the segments 616 down around the exterior of the bearing portion 611 of the work, and up through slots 661 in the exterior of the segments 615. Simultaneously the quenching liquid flows from the holes 653 of ring 647 upwardly between the plate 642 and the guard 84 and thence, between the periphery of the workpiece and the guard 50. Thence it flows through radial slots 663 in the lower face of the upper die 640, joining the liquid flowing over the bore of the work. Thence the quenching liquid flows upwardly through a bore 665 of the upper die 640 and the spaced circularly arranged openings 256 in the plate 41 over the guards 50 and 84 and back to the sump of the machine, as described in the previous embodiment of the invention.

By adjusting the rings 647 and 648 in their seats on the plate 643 the amount of flow of the quenching fluid through the holes 645 and 646 can be varied separately so that control can be obtained over the flow of oil to the teeth and over the upper face of the work. A ring 667 is secured to the periphery of the lower die 642 by screws 668. This ring is provided with radially arranged slots 669 which register with radial slots in the lower die 642 to permit flow of the quenching liquid under the under face of the work.

Threaded on the expander member 625 is a nut 626. This nut serves as a stop to limit the upward movement of the piston 60 by engagement with plate 256 that is secured to piston 35. A set screw 627 is employed to lock the nut 626 to the expander 625.

The use and operation of the quenching press will be understood from the preceding description but may be summed up briefly here.

In setting up the machine, the operator adjusts the reducing valves 125, 160, and 180 (Fig. 11) by use of gauges 135, 222, and 177, respectively (Figs. 1 and 11), to obtain the pressures wanted in the ducts 127, 72, and 181, respectively. The throttle valve 189 is adjusted for the desired overall speed of descent of the piston 34, and the needle valve 186 is adjusted to control the speed of descent of the piston just before the upper die strikes the work to prevent the die from hitting the work while moving at high speed. The relief valves 137 and 199 are also adjusted to insure the desired pressures on the underface of the pistonhead 36 during the up and downstrokes, respectively, of the piston 34. Upper and lower dies and gripper segments of suitable shape are also mounted in position on the press.

In the normal non-working position of the machine, the piston 34 is in its "up" position and the bracket 82 is in its out or loading position. To adjust the stroke of the piston, the operator puts a workpiece, such as is to be hardened, over the gripper segments onto the lower die and presses the starter button 320 (Figs. 1 and 12). This starts the bracket motor 96 (Figs. 2 and 12), causing the arms 91 (Figs. 2 and 3) to swing the bracket into operating position.

The limit switch 360 is already closed, being held closed by the piston 34 acting through the angle plate 76, stud 77, screw 79, bar 95 and angle plate 88 (Figs. 2 and 3). When the bracket 82 reaches operating position, the pin 176 (Fig. 5), which is carried by one of the crank members 100, will have rotated to a position to trip the limit switch 348. Circuits will therefore be closed to the solenoids 146, 170 and 171 (Figs. 11 and 12) causing the valve 143 to be closed and the valves 174 and 175 to be opened. This puts pressure on the top side of the piston 34 and the piston descends.

During the swing of the bracket 82 from loading to operating position, the piston 34 acting through the angle plate 76 (Fig. 3) and its associated parts holds the arms 93 and 91 in their elevated positions shown in Fig. 2. As soon as the piston starts to descend, however, the centering member 115 moves into its seat on the centering member 119, aligning the work accurately with the upper die.

The operator can stop the descent of the piston 34 at any time by releasing the starter button 320. The piston will then settle to a stop. A quick stop can be obtained by pressing in the stop button 323 (Figs. 1 and 12) which breaks the circuit to the solenoid 146, allowing the valve 143 to open, putting the top side of the piston 34 on exhaust.

When the upper die 45 (Fig. 4) or 640 (Fig. 9) engages the workpiece, the operator adjusts the bracket 216 (Fig. 6) along the rod 212 until the light 590 (Fig. 12) is illuminated. This will occur when the limit switch 206 is closed, namely, when the roller 218 is on the dwell portion 57 of the cam member 52. Thus, the point for deceleration of the downstroke of the piston 34 may be determined to prevent the upper die from striking a heated workpiece at high speed.

If the operator desires to move the upper die away from the work, he simply keeps his finger on the stop button. This deenergizes solenoid 171, and pressure is then put on the underside of the pistonhead 36, causing the piston to ascend rapidly. If the operator keeps his finger on the stop button long enough, the ascending piston will engage angle plate 76 (Figs. 2 and 3), lifting bar 95 and causing angle piece 88 to close limit switch 360. This will start bracket motor 96 again and cause the bracket to be swung out to loading position.

Having determined what sort of quenching cycle is required in order to harden the particular work which is to be hardened, the operator adjusts the selector buttons 263, 264, 265, 267, 268, 269, 270, 271, and 272 (Figs. 1 and 12) and the timer buttons 260, 261, and 262 to obtain this cycle. These buttons allow for great flexibility in the choice of the cycle. The rate of flow of the quenching liquid to the work during any part of the hardening cycle can be controlled very closely, and the time of each stage of the hardening operation as well as of the whole operation can be determined most precisely.

When the machine is all ready for operation, the operator throws the selector knob 280 (Figs. 1 and 7) over from "manual" to "automatic" position. This shifts the limit switch 291 (Figs. 7 and 12) so that it breaks connection between the lines 311 and 596 (Fig. 12) and makes connection between the lines 300 and 301. It also shifts the three-way valve 148 (Figs. 7, 8, and 11) to cause it to connect ducts 147 and 149 instead of ducts 147 and 287.

The operator then puts a hot workpiece over the gripper segments and onto the lower die and presses the starter button 320. This starts not only the bracket motor 96 but also the pump-drive motor 335. The bracket motor 96 then swings the work into operative position.

As the crank members 100 start to rotate in this swinging movement, the pin 176 (Fig. 5) moves away from limit switch 380 allowing this switch to close. When the bracket reaches its "in" position, this pin shifts limit switch 348. This stops the bracket motor 96 and causes solenoids 146, 170 and 171 (Figs. 11 and 12) to be energized, closing valve 143 and opening valves 174 and 175. The piston 34, therefore, descends quite rapidly until cam member 52 (Fig. 6) strikes roller 218. This releases limit switch 207 and solenoid 170 is deenergized and valve 174 is closed. This slows down the piston prior to engagement of the upper die with the work because with valve 174 closed the motive fluid can flow to the upper face of pistonhead 36 only through needle valve 186.

At the point that the upper die fully engages the work, the roller 218 (Fig. 6) rides up on the portion 56 of the cam 52, causing the lever 209 to shift the limit switch 206. This remakes the circuit to the solenoid 170, causing the valve 174 (Fig. 11) to be reopened and putting full pressure again on the upper face of the pistonhead 36 to hold the upper die firmly in engagement with the work to clamp the work. At the same time, a circuit is closed to timer 395 (Fig. 12) and those of the solenoids 238, 239, and 240 (Figs. 2 and 12) are energized which the operator has selected for energization by adjusting the selector buttons 263, 264, and 265 (Figs. 1 and 12) to their "on" positions. The energized solenoids open the corresponding valves 235, 236, and/or 237. The quenching liquid then flows over the work.

In the descent of the piston 34, the upper guard 50 (Fig. 4) has been brought into engagement with the lower guard 84 and the ring 51 seals the enclosure around the work formed by the two guards so that the quenching liquid is held in and around the work. In the descent of the piston 34, the pilot 64, in the example shown in Fig. 4, has centered up the segments 87 and the expander 65 has forced them into gripping engagement with the bore of the work. In the example illustrated in Figs. 9 and 10, the two expanders 625 and 630 have forced the segments 615 and 616, respectively, into engagement with the bore of the work and the tip of the gear teeth, respectively. The upper and lower dies hold the work against warpage, therefore, while the gripper segments hold its bore against eccentricity, during the hardening operation.

The quenching liquid flows over the work in the first stage of the hardening operation for the time set by adjustment of the potentiometer button or switch 260 (Figs. 1 and 12). Then the second timer 500 comes into operation and the second stage of the hardening operation takes place with the quenching liquid flowing over the work at a rate determined by the settings of selector buttons 267, 268, and 269 and for the time determined by the setting of the potentiometer button or switch 261. Then the third timer 545 comes into operation and the third stage of the hardening operation takes place with the quenching liquid flowing over the work at a rate determined by the settings of selector buttons 270, 271, and 272 and for the time determined by the setting of the potentiometer button or switch 262.

When the timer 545 has completed its operation, the circuit to the coil 325 of controller 327 is broken, and the motor 335, which drives the quenching pump 228 (Fig. 2), is stopped. Simultaneously, the circuits to the solenoids 146, 170, and 171 (Figs. 11 and 12) are broken. The upper side of pistonhead 36 is thus put on exhaust and the under side on supply. The piston 34 ascends rapidly, therefore, withdrawing the upper die, pilot, and expander away from the work.

When the piston reaches its topmost position, it causes the angle plate 76 (Fig. 3) to lift the bracket 82 upwardly disengaging the centering member 115 (Fig. 4) from its seat 119. It also causes the angle piece 88 (Figs. 2 and 3) to close the limit switch 360 (Figs. 2 and 12). This closes a circuit to the coil 575 of controller 345, starting the bracket motor 96 (Figs. 2 and 12) to move the bracket 82 to loading position. When the bracket reaches this position, the pin 176 (Fig. 5) will have rotated to a position to open limit switch 380 (Figs. 5 and 12). This stops the bracket motor 96. The cycle of the machine is complete.

While the invention has been described in connection with a particular embodiment and in connection with particular uses for this embodiment, it will be understood that the invention is capable of further modifications and uses and that this application is intended to cover any adaptations, uses or embodiments of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. A quenching press comprising a frame, a clamping member reciprocably mounted on the frame, a work support pivotally mounted on the frame, means for rocking the work support in opposite directions about its pivot to move it from operative position in alignment with the clamping member to loading position out of alignment therewith, and vice versa, means for reciprocating the clamping member to move it from released position to clamping position, and vice versa, and means for interconnecting the two first-named means so that the reciprocating means for the clamping member can not be actuated unless the work support is in operative position.

2. A quenching press comprising a frame, a work support, a clamping member movably mounted on the frame, fluid pressure operated means for reciprocating the clamping member to move it to and from operative position, a pair of ducts for supplying the motive fluid to said fluid pressure operated means to move the clamping member to operative position, an adjustable throttle valve for controlling the rate of flow of the motive fluid through one of the ducts, a movable shut-off valve for controlling supply of the motive fluid through the other duct, and cam means connected to the clamping member to control the opening and closing of the shut-off valve.

3. A quenching press comprising a frame, a work support, a clamping member movably mounted on the frame, fluid pressure operated means for reciprocating the clamping member to move it to and from operative position, a pair of ducts for supplying the motive fluid to said fluid pressure operated means to move the clamping member to operative position, an adjustable throttle valve for controlling the rate flow of the motive fluid through one of the ducts, a movable shut-off valve for controlling supply of the motive fluid through the other duct, and cam means connected to the clamping member to control the opening and closing of the shut-off valve, said cam means being constructed to hold the shut-off valve fully open until the clamping member approaches clamping position, then to close said valve until the clamping member has fully engaged the work, and then to open said shut-off valve fully again.

4. A quenching press comprising a frame, a work support mounted on the frame for reciprocation between loading and operative positions, a clamping member mounted on the frame for reciprocation between released and clamping positions, means for reciprocating the work support, means for reciprocating the clamping member, means connected to the work support for actuating said second-named reciprocating means, when the work support reaches operative position on movement thereof from loading position, to move the clamping member to clamping position, means for supplying a quenching medium to the work, means connected to the second-named reciprocating means for actuating said supply means when the clamping member reaches clamping position, a timer connected both to said supply means and to the means for reciprocating the clamping member, and means connected to the clamping member for actuating said timer when the clamping member reaches clamping position, said timer controlling both the time of flow of the quenching medium and the time during which the clamping member remains in clamping position, the means for supplying the quenching medium being stopped and the means for reciprocating the clamping member being actuated to move the clamping member to released position when the timer completes its cycle.

5. A quenching press comprising a frame, a work support mounted on the frame for reciprocation between loading and operative positions, a clamping member mounted on the frame for reciprocation between released and clamping positions, means for reciprocating the work support, means for reciprocating the clamping member, means for interlocking the two reciprocating means so that when the work support is moved to operative position, the second-named reciprocating means is actuated to move the clamping member to clamping position and when the clamping member is moved to released position the first-named reciprocating means is actuated to move the work support to loading position, means for supplying a quenching medium to the work, means connected to the second-named reciprocating means for actuating said supply means when the clamping member reaches clamping position, a timer connected both to said supply means and to the second-named reciprocating means, and means connected to the clamping member for actuating said timer when the clamping member reaches clamping position, said timer controlling both the time of flow of the quenching medium and the time during which the clamping member remains in clamping position, the means for supplying the quenching medium being stopped and the means for reciprocating the clamping member being actuated to move the clamping member to released position when the timer completes its cycle.

6. A quenching press comprising a frame, a work support, a clamping member for clamping the work on the work support, a conduit through which the quenching liquid is supplied to the work, a plurality of valves controlling the rate of flow of the quenching liquid through said conduit and so arranged that, when all of the valves are open, the quenching liquid flows at a maximum rate to the work, a plurality of adjustable timers operable successively and a plurality of selector means operable in conjunction with each timer for controlling each of the valves and adjustable to determine which of the valves are to be opened during operation of each timer.

7. A quenching press comprising a frame, a work support, a guard member carried by the work support and adapted to surround a workpiece supported thereon, a reciprocable member, a clamping member secured to the reciprocable member and adapted to engage the work to clamp the same when the reciprocable member is moved in one direction, a guard member secured to the reciprocable member and surrounding the clamping member and adapted to coact with the first named guard member to form a well around the work when the clamping member is in clamping position, means for conducting a quenching liquid into said well, and means carried by one of the guard members for sealing the connection between said guard members when they are brought into engagement.

8. A quenching press comprising a frame, a work support, a clamping member, means for moving the clamping member into and out of operative relation with the work support, a duct for supplying the quenching fluid, a valve for controlling said supply, means actuated by movement of the clamping member when it reaches clamping position, to open said valve, means adjustable to provide different rates of flow of the quenching fluid through said supply duct over the clamped work during different adjustable successive periods of time, and means actuated on completion of the different periods of time to shut said valve and to move the clamping member to inoperative position.

9. A quenching press comprising a frame, a work support, a clamping member movably mounted on the frame, fluid pressure operated means for reciprocating the clamping member to move it to and from operative position, valve means for controlling the operation of said fluid pressure operated means, a cam connected to the clamping member to move therewith and connected to said valve means to operate same to reduce the rate of movement of the clamping member in its movement to operative position just before the clamping member engages the work, and to apply full pressure on the clamping member after engagement with the work.

10. A quenching press comprising a frame, a work support movably mounted on the frame for movement from loading to operative position and vice versa, a clamping member movably mounted on the frame for movement from released to clamping position and vice versa, means for effecting the described movements of the work support and clamping member, and means interconnecting said movements so that movement of the work support from loading to operative position actuates the means for moving the clamping member, to cause the clamping member to be moved from released to operative position, and movement of the clamping member from operative to released position actuates the means for moving the work support, to cause the work support to be moved from operative to loading position, means for supplying a quenching fluid to the work when the clamping member is in operative position, and means for timing the period of flow of the quenching fluid, said timing means being so connected operatively with the means for moving the clamping member that the timing means is tripped into operation when the clamping member reaches clamping position, and that, when the timing means has operated for the predetermined period, the means for moving the clamping member is actuated to move the clamping member to released position.

11. A quenching press comprising a frame, a work support movably mounted on the frame for movement from loading to operative position and vice versa, a clamping member mounted on the frame for movement from released to operative position and vice versa, a seating member for aligning the work support axially with the clamping member to hold the work support against lateral movement when the work support is in operative position, and means actuated by the clamping member for lifting the work support off the seating member when the clamping member is moved to released position.

12. A quenching press comprising a frame, a work support, a pair of arms pivotally connected to opposite sides of the work support, a rockable member pivotally mounted on the frame and to which said arms are pivotally connected, a clamping member movably mounted on the frame for movement from released to clamping position, means for rocking said arms to move the work support from loading to operative position and vice versa, said frame being provided with a seat, said work support having a centering portion on the back thereof to engage said seat when the work support is in operative position to hold the work support in axial alignment with the clamping member, and means connected to the clamping member adapted to rock said rockable member upwardly to lift the work support off its seat when the clamping member is moved to released position.

13. A quenching press comprising a frame, a work support movably mounted on the frame, means for moving the work support from loading to operative position and vice versa, a motor for actuating said means, a clamping member for clamping the work on the work support when the work support is in operative position, fluid pressure operated means for reciprocating the clamping member to move it from released to operating position and vice versa, valve means for controlling the direction of application of fluid pressure to the reciprocating means, a conduit for supplying a quenching liquid to the work, valve means for controlling the flow of the quenching liquid through said conduit, means connected to the work support for stopping said motor and shifting said first named valve means to move the clamping member to operative position, when the work support reaches operative position and means connected to the reciprocating means for opening the second named valve means to permit flow of the quenching liquid around the work, when the clamping member reaches clamping position.

14. A quenching press comprising a frame, a work support movably mounted on the frame, means for moving the work support from loading to operative position and vice versa, a motor for actuating said means, a clamping member for clamping the work on the work support when the work support is in operative position, fluid pressure operated means for reciprocating the clamping member to move it from released to operative position and vice versa, valve means for controlling the direction of application of fluid pressure to the clamping member, a conduit for supplying a quenching liquid to the work, valve means for controlling the flow of the quenching liquid through said conduit, means adapted for movement of the work support to operative position to stop said motor and shift said first named valve means to move the clamping member to operative position, means adapted when the clamping member is in operative position to open the second named valve means to permit the flow of the quenching liquid around the work, means for predetermining the time of the quenching operation, and means operable on expiration of such time to close the second named valve means and shift the first named valve means to cause the clamping member to be moved to released position, and means operable on movement of the clamping member to released position to restart said motor to cause the work support to be moved to loading position.

15. A quenching press comprising a frame, a work support movably mounted on the frame, means for moving the work support from loading to operative position and vice versa, a clamping member for clamping the work on the work support when the work support is in operative position, means for supplying a quenching liquid to the work, means for moving the clamping member to operative position, means connected to the work support for actuating said last-named means when the work support reaches operative position, means connected to the clamping member for actuating the quenching liquid supply means when the clamping member reaches clamping position, and means for timing the duration of supply of the quenching liquid to the work.

16. A quenching press comprising a frame, a work support, a clamping member for clamping the work on the work support, a conduit through which the quenching liquid is supplied to the work, a plurality of valves for controlling the rate of flow of the quenching liquid through said conduit, a plurality of timers for controlling successively the operation of quenching, and a plurality of selectors, one for each valve, associated with each timer and adjustable to determine the number of valves that are open during operation of each timer.

17. A quenching press comprising a frame, a work support mounted on the frame, a clamping member for clamping the work on the work support, a main pressure duct for supplying the quenching liquid, a delivery duct for delivering the quenching liquid to the work, a plurality of pipes connecting the main pressure duct with the delivery duct, a shut-off valve in each pipe, said valves and pipes being proportioned so that different volumes, respectively, of liquid flow through each pipe from the main duct to the delivery duct, and adjustable means for controlling the periods, during operation of the press, during which the different valves are open.

OLIVER F. BAUER.

REFERENCES CITED

The following references are of record in the file of this patent:

UNITED STATES PATENTS

| Number | Name | Date |
|---|---|---|
| 315,943 | Howe | Apr. 14, 1885 |
| 946,584 | Smith | Jan. 18, 1910 |
| 1,904,986 | Scott et al. | Apr. 18, 1933 |
| 2,010,703 | Slade et al. | Aug. 6, 1935 |
| 2,017,865 | Morgan | Oct. 22, 1935 |
| 2,166,731 | Schicht | July 18, 1939 |
| 2,202,759 | Denneen et al. | May 28, 1940 |
| 2,264,301 | Denneen et al. | Dec. 2, 1941 |
| 2,314,120 | Braun | Mar. 16, 1943 |
| 2,317,440 | Cannon | Apr. 27, 1943 |
| 2,328,919 | Merriman | Sept. 7, 1943 |
| 2,378,044 | Sorenson et al. | June 12, 1945 |
| 2,387,414 | Shaks | Oct. 23, 1945 |